(12) United States Patent
Yamaguchi

(10) Patent No.: US 12,222,505 B2
(45) Date of Patent: Feb. 11, 2025

(54) OPTICAL MODULE AND HEAD-MOUNTED DISPLAY APPARATUS

(71) Applicant: SEIKO EPSON CORPORATION, Tokyo (JP)

(72) Inventor: Tokito Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 475 days.

(21) Appl. No.: 17/680,492

(22) Filed: Feb. 25, 2022

(65) Prior Publication Data

US 2022/0276492 A1  Sep. 1, 2022

(30) Foreign Application Priority Data

Feb. 26, 2021  (JP) .................. 2021-029690

(51) Int. Cl.
   *G02B 5/04*  (2006.01)
   *G02B 27/01*  (2006.01)

(52) U.S. Cl.
   CPC .......... *G02B 27/0172* (2013.01); *G02B 5/04* (2013.01); *G02B 2027/0132* (2013.01); *G02B 2027/0178* (2013.01)

(58) Field of Classification Search
   None
   See application file for complete search history.

(56) References Cited

U.S. PATENT DOCUMENTS

| | | | |
|---|---|---|---|
| 6,404,556 B1 | 6/2002 | Kobayashi | |
| 6,646,809 B1 * | 11/2003 | Ishino | G02B 27/0172 359/633 |
| 6,795,042 B1 * | 9/2004 | Nagata | G02B 27/0172 345/32 |
| 2002/0018295 A1 * | 2/2002 | Okuyama | G02B 27/0172 359/443 |
| 2002/0105738 A1 | 8/2002 | Kobayashi et al. | |
| 2004/0223122 A1 * | 11/2004 | Inoguchi | G02B 27/0172 353/38 |
| 2004/0233555 A1 * | 11/2004 | Matsunaga | G02B 17/0848 359/857 |
| 2005/0219671 A1 * | 10/2005 | Inoguchi | G02B 27/017 359/208.1 |

FOREIGN PATENT DOCUMENTS

JP    2000-333098 A    11/2000

* cited by examiner

*Primary Examiner* — William R Alexander
*Assistant Examiner* — Mackenzi Waddell
(74) *Attorney, Agent, or Firm* — Oliff PLC

(57) ABSTRACT

An optical module includes: an image element; a prism mirror that reflects image light emitted from the image element at an inner reflection portion; a combiner that reflects the image light from the prism mirror toward a pupil position; and a barrel that is disposed between the prism mirror and the combiner and that positions the prism mirror. The barrel includes a first positioning surface brought into contact with the prism mirror in a second direction perpendicular to a first imaginary plane and parallel to a normal line of a second imaginary plane on which the image light emitted from an emission portion of the prism mirror is incident, and a second positioning portions brought into contact with the prism mirror in a third direction perpendicular to the first direction and intersecting the second direction.

15 Claims, 13 Drawing Sheets

OPTICAL MODULE AND HEAD-MOUNTED DISPLAY APPARATUS

The present application is based on, and claims priority from JP Application Serial Number 2021-029690, filed Feb. 26, 2021, the disclosure of which is hereby incorporated by reference herein in its entirety.

BACKGROUND

1. Technical Field

The present disclosure relates to an optical module that enables observation of a virtual image, a head-mounted display apparatus including the optical module, and a method for manufacturing the optical module.

2. Related Art

For head-mounted display apparatuses that allow observation of virtual images, there exists one that includes a plurality of prisms with an obliquely incident mirror incorporated therein, and that causes imaging light from an image element to be incident on an eye of the user via a zigzag optical path formed by a mirror reflection (refer to JP-A-2000-333098). In this apparatus, when a first prism and a second prism are mutually assembled, two first coupling portions and two second coupling portions are used to suppress shift in the assembly position of the second prism relative to the first prism. For example, the first coupling portions are each a coupling portion that is provided in the first prism and that includes a protrusion, while the second coupling portions are each a coupling portion that is provided in the second prism and that includes a recess (see FIG. 8 in JP-A-2000-333098). Alignment between the first prism and the second prism is performed by fitting the respective protrusions of the first coupling portions into the corresponding recesses of the second coupling portions.

In the above-described apparatus of JP-A-2000-333098 alignment is performed by fitting protrusions into recesses. However, gaps are unavoidably formed between these portions, causing position shift. When the accuracy of alignment between the prisms decreases in this way, there is a risk that the optical performance of the display apparatus may decrease.

SUMMARY

An optical module or a head-mounted display apparatus according to an aspect of the present disclosure includes: an image element that emits an image light; a first reflection member that includes: an incident portion on which the image light is incident, an emission portion that emits the image light, and a reflection portion that reflects the image light from the incident portion toward the emission portion; a second reflection member that reflects the image light from the first reflection member toward a pupil position; and a supporting member that is disposed between the first reflection member and the second reflection member in an optical path of the image light, wherein the supporting member includes: a first limiting portion, a second limiting portion facing the first limiting portion in a first direction, a pair of first positioning portions contacts with the first reflection member in a second direction intersecting the first direction, and a second positioning portion contacts with the first reflection member in a third direction perpendicular to the first direction and intersecting the second direction.

A method for manufacturing an optical module according to one aspect of the present disclosure is a method for manufacturing an optical module including an image element, a first reflective optical member configured to cause image light emitted from the image element to be incident on an incident portion, to be reflected by an inner reflection portion, and to be emitted from an emission portion, a second reflective optical member configured to reflect the image light from the first reflective optical member toward a pupil position, and a supporting member disposed between the first reflective optical member and the second reflective optical member and configured to position the first reflective optical member, wherein the first reflective optical member emits the image light from the emission portion in a direction intersecting an optical axis of the image light incident on the incident portion as seen from a first direction parallel to a normal line of a first imaginary plane including the optical axis of the image light incident on the incident portion and an optical axis of the image light emitted from the emission portion, the supporting member includes a first limiting portion and a second limiting portion facing the first reflective optical member in the first direction, the supporting member includes a first positioning surface brought into contact with the first reflective optical member in a second direction perpendicular to the first imaginary plane and parallel to a normal line of a second imaginary plane on which the image light emitted from the emission portion of the first reflective optical member is incident, and a second positioning portion brought into contact with the first reflective optical member in a third direction perpendicular to the first direction and intersecting the second direction, the method including, while positioning the first reflective optical member by fitting using the first limiting portion and the second limiting portion, positioning the first reflective optical member by biasing using the first positioning surface and the second positioning portion.

BRIEF DESCRIPTION OF THE DRAWINGS

FIG. 8 is a set of views illustrating a barrel, a prism mirror, and the like.

DESCRIPTION OF EXEMPLARY EMBODIMENTS

Hereinafter, specific embodiments of an optical module and a head-mounted display apparatus according to the present disclosure will be described with reference to the accompanying drawings.

Figure 1:
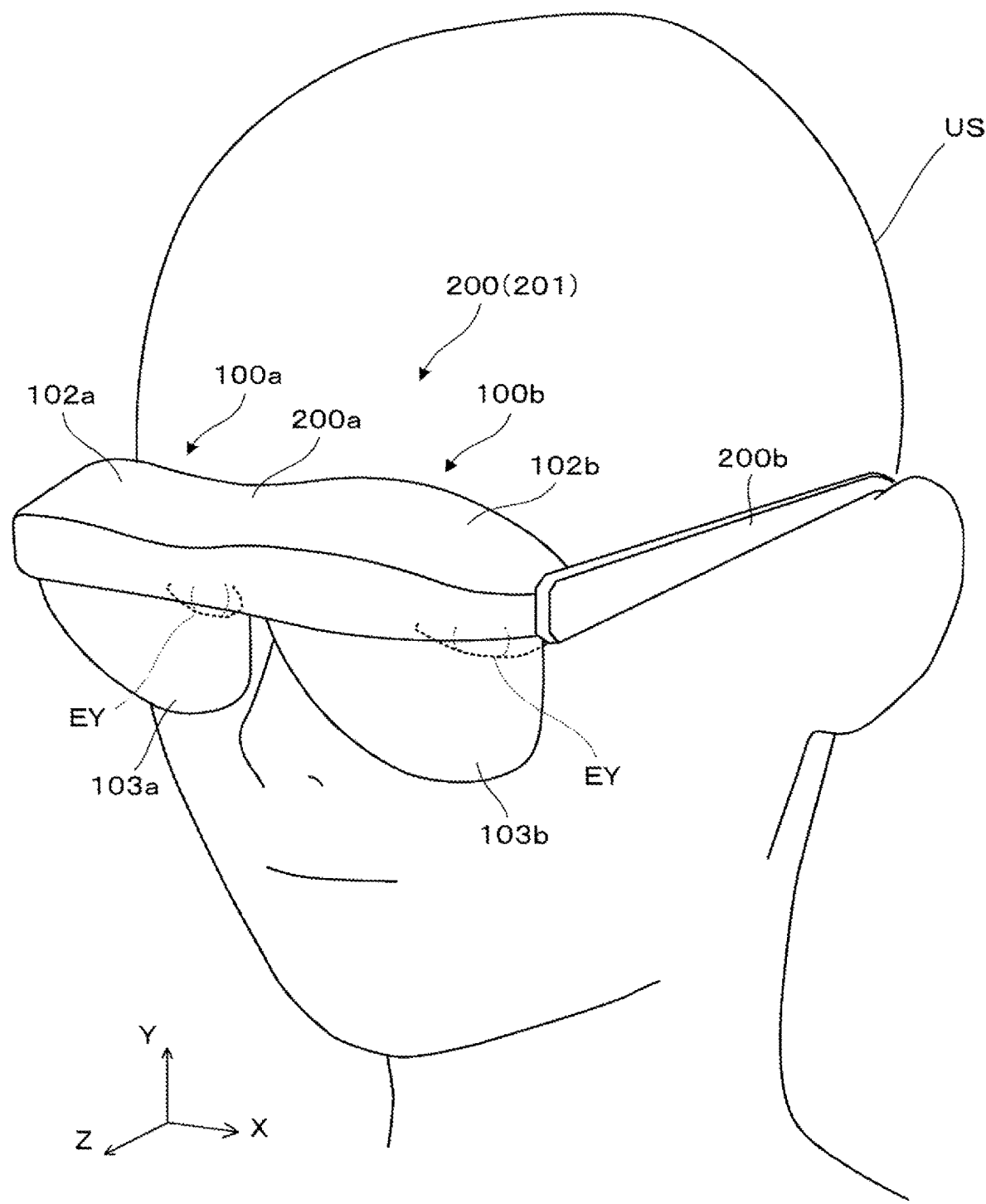
FIG. 1 is an external perspective view illustrating a mounted state of an HMD according to an embodiment.

FIG. 1 is a view illustrating a mounted state of an image display device 200. The image display device 200 is a head-mounted display apparatus, that is, a head-mounted display (hereinafter also referred to as the HMD) 201. The image display device 200 allows an observer or wearer US wearing the same to recognize an image as a virtual image. In FIG. 1 and the like, X, Y, and Z are an orthogonal coordinate system. The +X direction corresponds to the transverse direction in which the two eyes EY of an observer or wearer US wearing the image display device 200 or the HMD 201 are aligned. The +Y direction corresponds to the upward direction orthogonal to the transverse direction in which the two eyes EY of the wearer US are aligned. The +Z direction corresponds to the forward direction or the frontal direction for the wearer US. The ±Y direction is parallel to a vertical axis or a vertical direction.

The image display device 200 includes a main body 200a disposed so as to cover the front of the eyes of the wearer US, and a pair of temple-shaped support devices 200b that support the main body 200a. Functionally speaking, the main body 200a includes a first display device 100a for the right eye and a second display device 100b for the left eye. The first display device 100a includes a first display driving unit 102a disposed at an upper portion thereof, and a first combiner 103a that has a spectacle lens shape and covers the front of the eye. Similarly, the second display device 100b includes a second display driving unit 102b disposed at an upper portion thereof, and a second combiner 103b that has a spectacle lens shape and covers the front of the eye.

Figure 2:
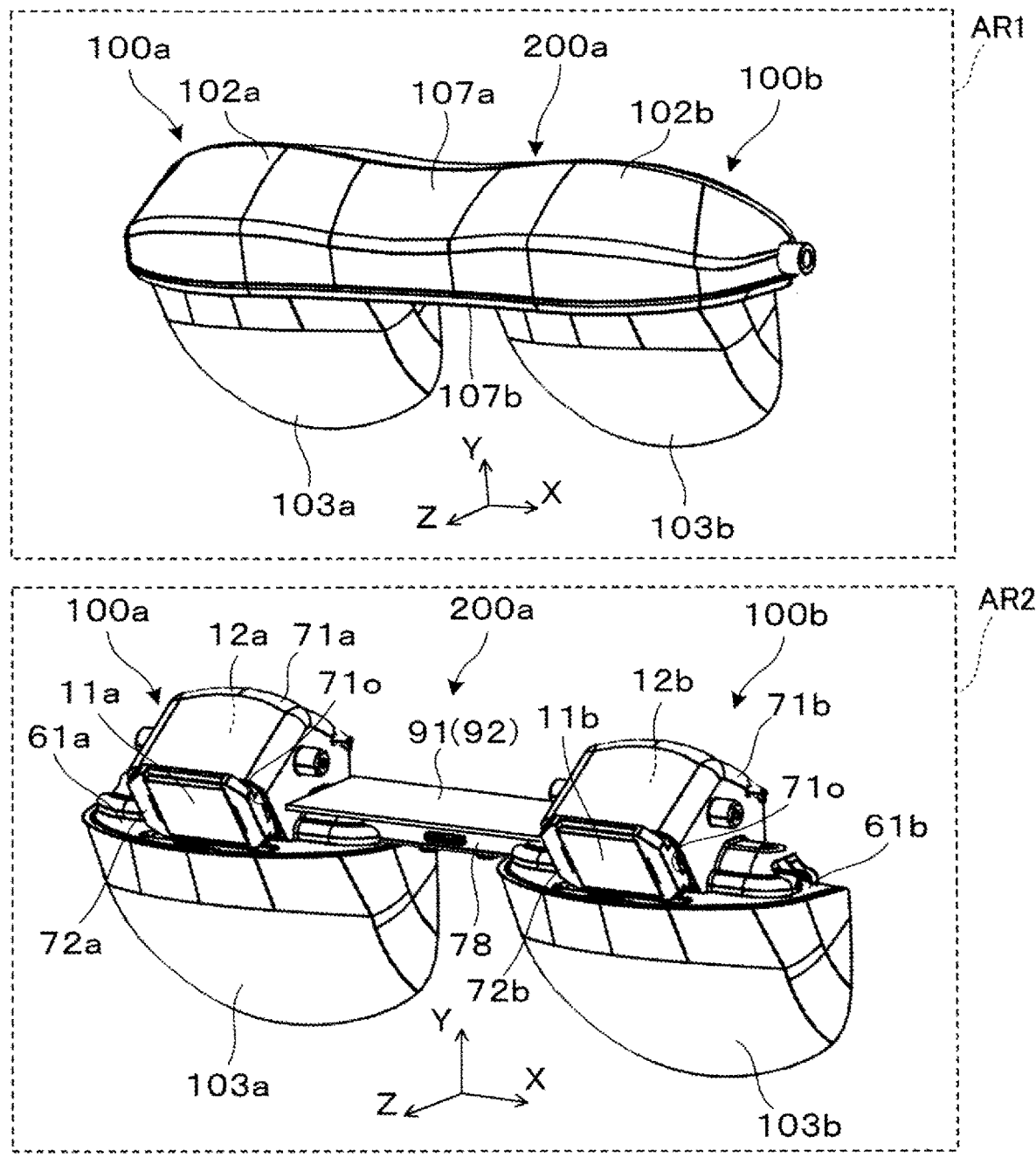
FIG. 2 illustrates a perspective view of an HMD main body and a perspective view of an interior with an outer packaging member removed.

The structure and the like of the main body 200a of the image display device 200 will be described with reference to FIG. 2. In FIG. 2, the region AR1 is an external perspective view of the main body 200a, while the region AR2 is a perspective view with an upper portion of the main body 200a exposed.

Of the main body 200a, the pair of display driving units 102a and 102b disposed on the +Y side, that is, on the upper side are coupled together and integrated, and are covered with a dome-shaped upper outer packaging member 107a that is elongated in the transverse direction, and a flat plate-shaped lower outer packaging member 107b. The first combiner 103a and the second combiner 103b each have a shape formed by cutting off the upper portion of a hemisphere protruding to the front, that is, in the +Z direction. The first combiner 103a and the second combiner 103b are disposed so as to stick out downward from the lower outer packaging member 107b.

The first display device 100a for the right eye includes a first image element 11a, a first optical system 12a, a first frame 61a, and a first combiner 103a. The first optical system 12a is covered with a first cover member 71a, which is an inner cover. The first image element 11a is disposed so as to close an opening 710 of the first cover member 71a, and is fixed to the first optical system 12a via a first holder 72a having a rectangular frame shape. The first image element 11a and the first optical system 12a correspond to the first display driving unit 102a.

The second display device 100b for the left eye includes a second image element 11b, a second optical system 12b, a second frame 61b, and a second combiner 103b. The second optical system 12b is covered with a second cover member 71b, which is an inner cover. The second image element 11b is disposed so as to close an opening 710 of the second cover member 71b, and is fixed to the second optical system 12b via a second holder 72b having a rectangular frame shape. The second image element 11b and the second optical system 12b correspond to the second display driving unit 102b. The second display device 100b for the left eye has the same structure and function as those of the first display device 100a for the right eye. In other words, the second image element 11b is similar to the first image element 11a, the second optical system 12b is similar to the first optical system 12a, and the second combiner 103b is similar to the first combiner 103a.

The first display device 100a and the second display device 100b are internally coupled and fixed together with a fixing member 78 therebetween. In other words, the fixing member 78 supports at the center the pair of frames 61a and 61b incorporated into the pair of display devices 100a and 100b, and maintains a state in which the first display device 100a and the second display device 100b are relatively positioned. Specifically, the first frame 61a is coupled to one end of the rod-shaped fixing member 78 at an inner end near the second frame 61b, while the second frame 61b is coupled to the other end of the rod-shaped fixing member 78 at an inner end near the first frame 61a. The first frame 61a and the second frame 61b are semi-disk-shaped metal members, and are formed of a magnesium alloy, for example. The fixing member 78 is also formed of a magnesium alloy, for example. Forming the first frame 61a and the second frame 61b from a highly heat-dissipating material such as a magnesium alloy can increase heat dissipation efficiency for the heat generated by the image element 11a and the like. Forming the fixing member 78 from a highly heat-dissipating material such as a magnesium alloy can give the fixing member 78 an effect of cooling the first frame 61a and the second frame 61b by heat dissipation.

A rectangular plate-shaped printed wired board 91 is disposed above the fixing member 78 between the right display device 100a and the left display device 100b. The printed wired board 91 includes a control device 92 that controls the display operation of the first image element 11a and the second image element 11b. The control device 92 outputs a driving signal corresponding to the display image to the right image element 11a and the left image element 11b to control the display operation of the right image element 11a and the left image element 11b. The control device 92 includes, for example, an IF circuit, a signal processing circuit, and the like. In accordance with image data or an image signal received from the outside, the control device 92 causes the right image element 11a and the left image element 11b to display a two-dimensional image. Although not illustrated, the control device 92 includes a main substrate that integrates the operation of the first display device 100a and the operation of the second display device 100b. The main substrate may have, for example, an interface function of communicating with an external device (not illustrated) and performing signal conversion on a signal received from the external device, and an integration function of linking the display operation of the first display device 100a with the display operation of the second display device 100b.

Figure 3:
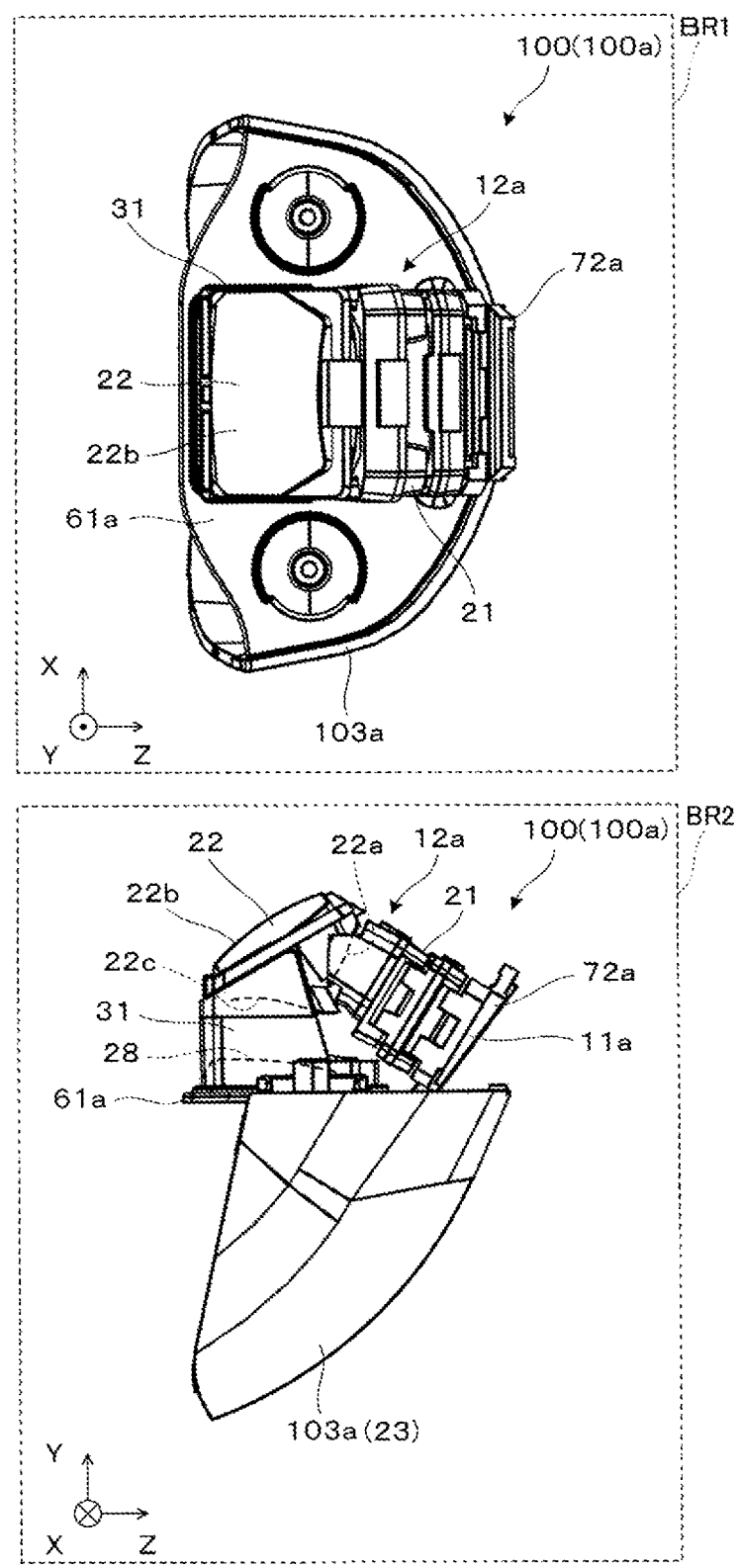
FIG. 3 illustrates a plan view and a left side view of an optical module.

FIG. 3 illustrates an optical module 100 constituting the first display device 100a. In FIG. 3, the region BR1 is a plan view of the optical module 100, while the region BR2 is a side view of the optical module 100. The first optical system 12a is fixed to the upper surface of the plate-shaped first frame 61a by adhesion or the like. The upper end of the first combiner 103a is fixed to the front half of the periphery of the first frame 61a by adhesion or the like. The first optical system 12a includes a barrel 31 that supports an optical element. The barrel 31 is a supporting member that is disposed between the prism mirror 22, which is a first reflective optical member that bends the optical path by reflection, and a first combiner 103a, which is a second reflective optical member that reflects image light from the prism mirror 22 toward the pupil position, and that positions the prism mirror 22. The first combiner 103a is a second reflective optical member that reflects the image light from the prism mirror 22 toward the pupil position. The barrel 31 is a frame-shaped member having a rectangular opening in plan view. The upper portion of the barrel 31 supports the prism mirror 22. The lower portion of the barrel 31 is fixed to the first frame 61a via a wedge type optical element 28. The prism mirror 22 supports a projection lens 21 at the rear, that is, on the −Z side. The projection lens 21 supports the first image element 11a via the first holder 72a at an end on the opposite side of the prism mirror 22.

Figure 4:
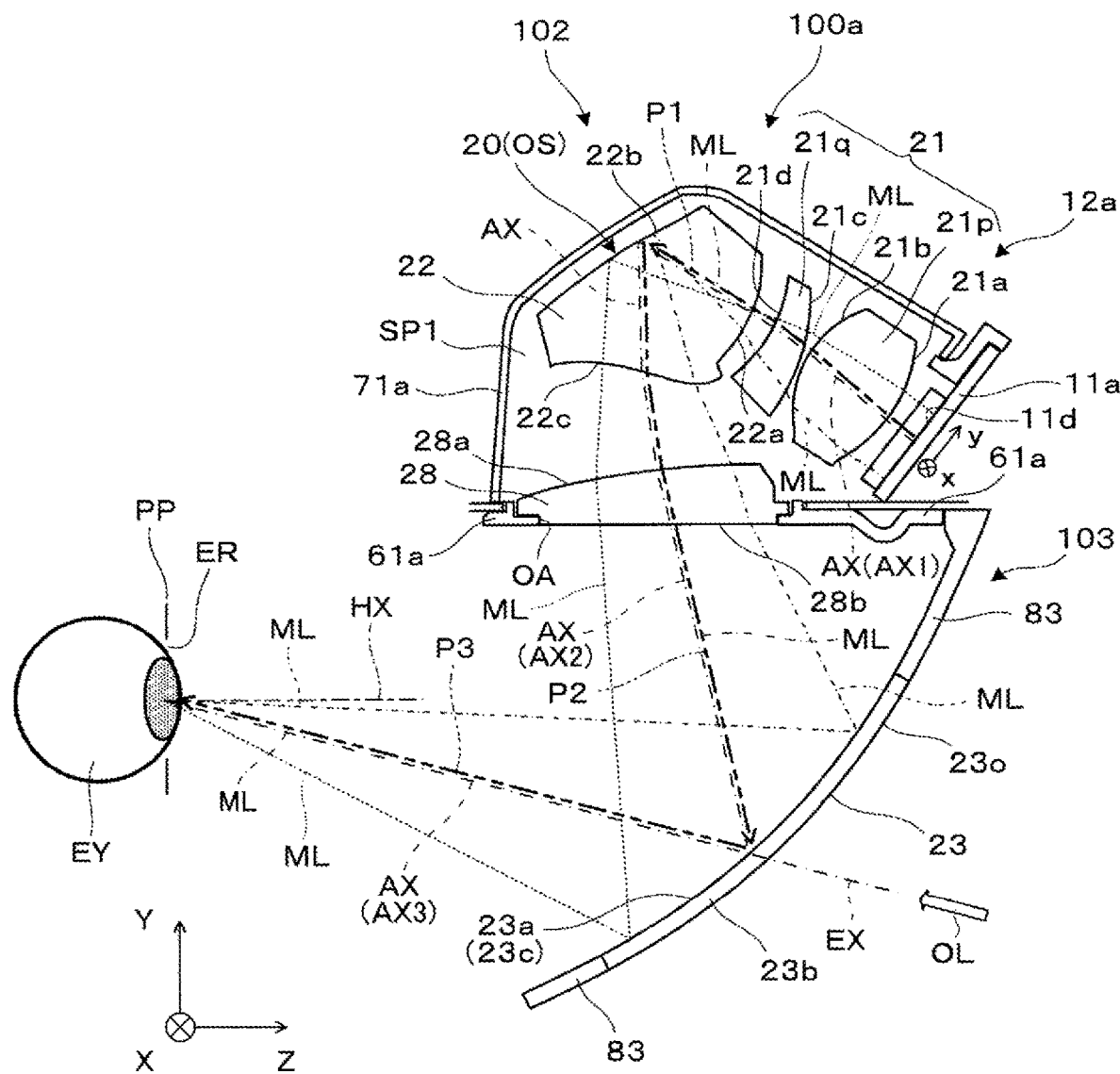
FIG. 4 is a conceptual side cross-sectional view illustrating an optical system inside an HMD.

FIG. 4 is a side cross-sectional view illustrating an optical structure of the first display device 100a. The first display device 100a includes the first image element 11a and an imaging optical system 20. The imaging optical system 20 includes the projection lens 21, the prism mirror 22, the wedge type optical element 28, and a see-through mirror 23. Of the imaging optical system 20, the projection lens 21, the prism mirror 22, and the wedge type optical element 28 correspond to the first optical system 12a illustrated in FIG. 3 and the like, while the see-through mirror 23 corresponds to the first combiner 103a. The first image element 11a, the projection lens 21, the prism mirror 22, and the wedge type optical element 28 are fixed to the first frame 61a in a mutually aligned state. The main body of the first image element 11a, the projection lens 21, and prism mirror 22 are housed in a space SP1 sandwiched between the first cover member 71a and the first frame 61a. The wedge type optical element 28 is disposed so as to fit into a step formed in an optical aperture OA of the first frame 61a. The periphery of the optical aperture OA is kept airtight.

The first image element 11a is a spontaneous light emission type display device. The first display element 11a is, for example, an organic electroluminescence (EL) display, and forms a color still image or moving image on a two-dimensional display surface 11d. The first image element 11a is disposed along an x-y plane that is slightly rotated about the X-axis and is inclined relative to the X-Y plane. The first image element 11a is driven by the printed wired board 91 to perform the display operation. The first display element 11a is not limited to organic EL displays, and can be replaced with a micro LED display, or a display device that uses an inorganic EL, an organic LED, a laser array, a quantum dot light emission type element, or the like. The first image element 11a is not limited to spontaneous light emission type image light generation devices, and may be an article that includes an LCD or other light modulation element, and that forms an image by illuminating the light modulation element with a light source such as a backlight. As the first image element 11a, a liquid crystal on silicon (LCoS; LCoS is a trade name), a digital micro-mirror device, or the like may be used instead of an LCD.

The projection lens 21 includes a first lens 21p and a second lens 21q. The first lens 21p includes an incident portion 21a and an emission portion 21b, while the second lens 21q includes an incident portion 21c and an emission portion 21d. The projection lens 21 receives the image light ML emitted from the first image element 11a and causes the same to be incident on the prism mirror 22. The projection lens 21 focuses the image light ML emitted from the first image element 11a into a state close to a parallel luminous flux. The prism mirror 22 includes an incident portion 22a, an inner reflection portion 22b, and an emission portion 22c. The prism mirror 22 emits the image light ML incident from the front so that the image light ML is bent in a direction inclined relative to a direction that is the reverse of the incident direction (direction of the light source as seen from the prism mirror 22). The wedge type optical element 28 includes a first surface 28a and a second surface 28b, and causes the image light ML emitted from the prism mirror 22 and going toward the see-through mirror 23 to pass therethrough. The see-through mirror 23 has a reflection portion 23a and an outer surface 23o. The see-through mirror 23 magnifies the intermediate image formed on the light emission side of the prism mirror 22.

The imaging optical system 20 is an off-axis optical system OS because the see-through mirror 23 is a concave mirror and for other reasons. In the case of the present embodiment, the projection lens 21, the prism mirror 22, and the see-through mirror 23 are disposed to be non-axisymmetric and have a non-axisymmetric optical surface. That the imaging optical system 20 is an off-axis optical system OS means that in the optical elements 21, 22, 28, and 23 constituting the imaging optical system 20, the optical path as a whole is bent before and after the incidence of beams on a plurality of reflection portions or refraction surfaces. In this imaging optical system 20, that is, the off-axis optical system OS, an optical axis AX is bent so that the optical axis AX extends along an off-axis surface (surface parallel to the Y-Z plane) corresponding to the plane of the drawing. In this imaging optical system 20, since the optical axis AX is bent in the off-axis surface parallel to the Y-Z plane, optical elements 21, 22, 28, and 23 are arranged along the off-axis surface. The optical axis AX of the imaging optical system 20 includes optical axis portions AX1, AX2, and AX3 that are disposed along the off-axis surface (surface parallel to the Y-Z plane), which is a reference surface extending in the longitudinal direction, and that are inclined relative to each other before and after reflection portions. The optical axis AX as a whole extends along an optical path of a main beam emitted from the center of the first image element 11a, and passes through the center of an eye ring ER corresponding to an eye point or the pupil. The optical axis AX is disposed in a Z shape formed by the plurality of optical axis portions AX1, AX2, and AX3 when seen in a cross section parallel to the Y-Z plane. In other words, in the off-axis surface parallel to the Y-Z plane, an optical path P1 from the projection lens 21 to the inner reflection portion 22b, an optical path P2 from the inner reflection portion 22b to the see-through mirror 23, and an optical path P3 from the see-through mirror 23 to the pupil position PP are bent in two stages to form a Z shape. The imaging optical system 20 is longitudinally arranged. The off-axis surface (surface parallel to the Y-Z plane) that is a reference surface extends parallel to the Y direction that is the longitudinal direction. In this case, the optical elements 21, 22, 28, and 23 constituting the first display device 100a are arranged with height positions varied in the longitudinal direction, which makes it possible to prevent an increase in the transverse width of the first display device 100a.

In the imaging optical system 20, the optical path P1 from the projection lens 21 to the inner reflection portion 22b extends in an obliquely upward direction toward the rear. In other words, in the optical path P1, the optical axis portion AX1 extends in a direction close to the middle between the −Z direction and the +Y direction. The optical path P2 from the inner reflection portion 22b to the see-through mirror 23 extends in an obliquely downward direction toward the front. In other words, in the optical path P2, the optical axis portion AX2 extends in a direction close to the middle between the +Z direction and the −Y direction. However, when the water surface direction (X-Z plane) is used as a reference, the inclination of the optical path P2 is greater than the inclination of the optical path P1. The optical path P3 from the see-through mirror 23 to the pupil position PP is in a state of being close to parallel to the Z direction. However, in the illustrated example, the optical axis portion AX3 is approximately −10° in the +Z direction with the downward direction being negative. In other words, an emission optical axis EX, which is an extension of the optical axis portion AX3, extends while inclining downward by approximately 10° relative to a central axis HX, which is parallel to the +Z direction to the front. This is because a line of sight of a human being is stable in a slightly downcast state in which the line of sight is inclined downward by approximately 10° relative to the horizontal direction. Note that the central axis HX extending in the horizontal direction to the pupil position PP assumes a case in which the wearer US wearing the first display device 100a relaxes in an upright posture, faces the front, and gazes at the horizontal direction or the horizon. Although a shape and posture of the head, including the disposition of the eyes and the disposition of the ears, of the individual wearer US wearing the first display device 100a are various, the average central axis HX can be set for the first display device 100a of interest by assuming the average head shape or head posture of the wearer US.

The incident portion 21a and the emission portion 21b of the first lens 21p constituting the projection lens 21 have asymmetry with respect to the longitudinal direction parallel to the Y-Z plane and intersecting the optical axis AX with the optical axis AX interposed therebetween, and have symmetry with respect to the transverse direction or the X direction with the optical axis AX interposed therebetween. The incident portion 21a and the emission portion 21d of the second lens 21q constituting the projection lens 21 have asymmetry with respect to the longitudinal direction parallel to the Y-Z plane and intersecting the optical axis AX with the optical axis AX interposed therebetween, and have symmetry with respect to the transverse direction or the X direction with the optical axis AX interposed therebetween. The first lens 21p and the second lens 21q are formed of, for example, a resin, but can also be formed of glass. The incident portion 21a and the emission portion 21b of the first lens 21p are free form surfaces, for example. The incident portion 21a and the emission portion 21b are not limited to free form surfaces, and can be aspherical surfaces. The incident portion 21c and the emission portion 21d of the second lens 21q are free form surfaces, for example. The incident portion 21c and the emission portion 21d are not limited to free form surfaces, and can be aspherical surfaces. When the incident portions 21a and 21c or the emission portions 21b and 21d are free form surfaces or aspherical surfaces, aberration can be reduced. In particular, when free form surfaces are used, the optical performance of an eccentric system is easily improved, and thus aberration of the imaging optical system 20 that is a non-coaxial off-axis optical system OS is easily reduced. Although detailed illustration is omitted, an antireflection film is formed on the incident portions 21a and 21c and the emission portions 21b and 21d.

The prism mirror 22 is a catadioptric optical member having a combined function of a mirror and a lens. The prism mirror 22 reflects the image light ML from the projection lens 21 while refracting the same. The prism mirror 22 is a first reflective optical member. The prism mirror 22 causes the image light ML to be incident thereinto via the incident portion 22a, causes the incident image light ML to be totally reflected in a non-frontal direction by the inner reflection portion 22b, and causes the incident image light ML to be emitted to the outside via the emission portion 22c. The incident portion 22a and the emission portion 22c are each an optical surface constituted by a curved surface, and contribute to improved resolution compared to a case in which the prism mirror 22 includes only a reflection portion or a case in which the incident portion 22a and the emission portion 22c are flat surfaces. The incident portion 22a, the inner reflection portion 22b, and the emission portion 22c, which are the optical surfaces constituting the prism mirror 22, have asymmetry with respect to the longitudinal direction parallel to the Y-Z plane and intersecting the optical axis AX with the optical axis AX interposed therebetween, and have symmetry with respect to the transverse direction or the X direction with the optical axis AX interposed therebetween. The prism mirror 22 is formed of, for example, a resin, but can also be formed of glass. The refractive index of a main body of the prism mirror 22 is set to a value such that total reflection at the inner surface is achieved in consideration of a reflection angle of the image light ML. The optical surfaces of the prism mirror 22, that is, the incident portion 22a, the inner reflection portion 22b, and the emission portion 22c are, for example, free form surfaces. The incident portion 22a, the inner reflection portion 22b, and the emission portion 22c are not limited to free form surfaces, and can be aspherical surfaces. In the prism mirror 22, when the optical surfaces 22a, 22b, and 22c are free form surfaces or aspherical surfaces, aberration can be reduced. In particular, when free form surfaces are used, the optical performance of an eccentric system is easily improved. The inner reflection portion 22b is not limited to those that reflect the image light ML by total reflection, and can be a reflection portion constituted by a metal film or a dielectric multilayer film. In this case, on the inner reflection portion 22b, a reflection film constituted by a single layer film or a multilayer film formed of a metal such as Al or Ag, for example, is formed by vapor deposition or the like, or a sheet-shaped reflection film formed of a metal is affixed. Although detailed illustration is omitted, an antireflection film is formed on the incident portion 22a and the emission portion 22c.

The wedge type optical element 28 is disposed between the prism mirror 22 and the see-through mirror 23, and has optical transparency. The wedge type optical element 28 has a role of improving the imaging state. The first surface 28a provided on the incident side of the wedge type optical element 28 is a flat but free form surface, has asymmetry with respect to the longitudinal direction parallel to the Y-Z plane with the optical axis AX interposed therebetween, and has symmetry with respect to the X direction perpendicular to the Y-Z plane, that is, the transverse direction with the optical axis AX interposed therebetween. An antireflective coating is formed on the first surface 28a. The second surface 28b provided on the emission side of the wedge type optical element 28 is a flat surface, and an antireflective coating is formed thereon. The wedge type optical element 28 has an increasing thickness on the +Z side that is anterior. Accordingly, distortion aberration caused by the prism mirror 22 and the like can be suppressed. The refractive index of the wedge type optical element 28 is different from the refractive index of the prism mirror 22. Accordingly, the degree of refraction and dispersion can be adjusted among the wedge type optical element 28, the prism mirror 22, and the like, which makes it easy to achieve achromatism, for example.

The see-through mirror 23 is a curved plate-shaped optical member functioning as a concave surface mirror, and reflects the image light ML from the prism mirror 22. In other words, the see-through mirror 23 reflects the image light ML from an emission region of the first optical system 12a toward the pupil position PP. The see-through mirror 23 covers the pupil position PP at which the eye EY or the pupil is disposed. The see-through mirror 23 has a concave shape toward the pupil position PP, and has a convex shape toward the outside world. The see-through mirror 23 is a concave transmissive mirror that covers the entire effective region of a screen in the view. The see-through mirror 23 is a collimator having a convergence function. The see-through mirror 23 converges the main beam of the image light ML temporarily spread out by imaging in the vicinity of the emission region of the first optical system 12a, which is the main beam of the image light ML emitted from each of points on the display surface 11d, at the pupil position PP. The see-through mirror 23 is a mirror plate having a structure in which a mirror film 23c having a transmissive property is formed on a front surface or a back surface of a plate-shaped body 23b. The see-through mirror 23 and the reflection portion 23a have asymmetry with respect to the longitudinal direction parallel to the Y-Z plane and intersecting the optical axis AX with the optical axis AX interposed therebetween, and have symmetry with respect to the transverse direction or the X direction with the optical axis AX interposed therebetween. The reflection portion 23a of the see-through mirror 23 is, for example, a free form surface. The reflection portion 23a is not limited to free form surfaces, and can be an aspherical surface. When the see-through mirror 23 is a free form surface or an aspherical surface, aberration can be reduced. In particular, when a free form surface is used, aberration of the imaging optical system 20 that is an off-axis optical system or a non-coaxial optical system can be easily reduced.

The see-through mirror 23 is a transmissive type reflection element that causes part of light to be transmitted upon reflection. The reflection portion 23a or the mirror film 23c of the see-through mirror 23 is formed by a reflection layer having a semi-transmissive property. Accordingly, outside light OL passes through the see-through mirror 23, which enables a see-through view of the outside world, and makes it possible to superimpose a virtual image on an outside image. At this time, if the plate-shaped body 23b that supports the mirror film 23c has a thickness of less than or equal to approximately a few millimeters, a change in magnification of the outside image can be reduced. From the viewpoints of ensuring a brightness of the image light ML and facilitating see-through observation of the outside image, the reflectance of the image light ML or the outside light OL at the mirror film 23c is 10% or greater and 50% or less in the assumed incident angle range of the image light ML. The plate-shaped body 23b that serves as the base of the see-through mirror 23 is formed of, for example, a resin, but can also be formed of glass. The plate-shaped body 23b is formed of the same material as that of a support plate 83 that supports the plate-shaped body 23b from the periphery. The plate-shaped body 23b has the same thickness as that of the support plate 83. The mirror film 23c is formed of, for example, a dielectric multilayer film constituted by a plurality of dielectric layers having an adjusted film thickness. The mirror film 23c may be a single layer film or a multilayer film of a metal such as Al or Ag having an adjusted film thickness. The mirror film 23c can be formed by lamination, but can also be formed by affixing a sheet-shaped reflection film. An antireflection film is formed on the outer surface 23o of the plate-shaped body 23b.

To describe the optical path, the image light ML from the first image element 11a is incident on the projection lens 21 and emitted from the projection lens 21 in a substantially collimated state. The image light ML that passed through the projection lens 21 is incident on the prism mirror 22, passes through the incident portion 22a while being refracted thereby, is reflected by the inner reflection portion 22b with a high reflectance close to 100%, and is refracted again by the emission portion 22c. The image light ML from the prism mirror 22 is incident on the see-through mirror 23 via the wedge type optical element 28 and is reflected by the reflection portion 23a with a reflectance of approximately 50% or less. The image light ML reflected by the see-through mirror 23 is incident on the pupil position PP at which the eye EY or the pupil of the wearer US is disposed. The outside light OL that has passed through the see-through mirror 23 or the support plate 83 therearound is also incident on the pupil position PP. In other words, the wearer US wearing the first display device 100a can observe a virtual image formed by the image light ML superimposed on the outside image.

Figure 5:
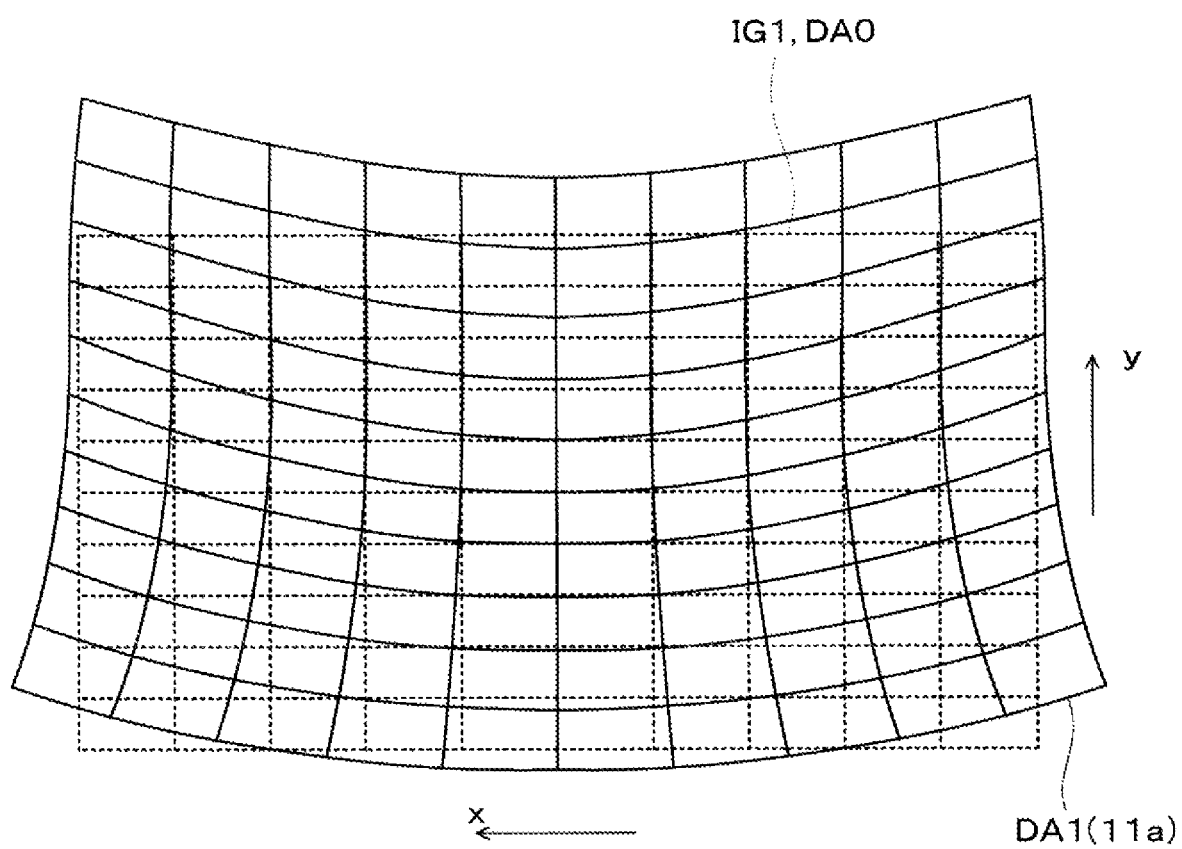
FIG. 5 is a diagram illustrating distortion correction of a display image.

As illustrated in FIG. 5, the display image formed on the display surface 11d of the first image element 11a is a modified image DA1 to which distortion such as trapezoidal distortion has been applied in advance. In other words, because the imaging optical system 20 is an off-axis optical system OS, it is not easy to remove distortion such as trapezoidal distortion by the optical system itself. Therefore, by causing the image displayed on the first image element 11a to have a reverse distortion that cancels the distortion formed by the projection lens 21, the prism mirror 22, the wedge type optical element 28, and the see-through mirror 23, it is possible to cause a pixel array of a projected image IG1 of the virtual image observed at the pupil position PP after passing through the imaging optical system 20 to have a grid pattern corresponding to the original display image DA0, and the contour can be made rectangular. In other words, the first image element 11a corrects the distortion formed by the projection lens 21, the prism mirror 22, the wedge type optical element 28, and the see-through mirror 23. Consequently, while allowing the distortion generated by the see-through mirror 23 and the like, aberration of the entire optical system including the first image element 11a can be restrained. Accordingly, the degree of freedom in the disposition and size of optical elements such as the prism mirror 22 is increased, making it easy to ensure the optical performance of the first display device 100a while miniaturizing the first display device 100a.

Figure 6:
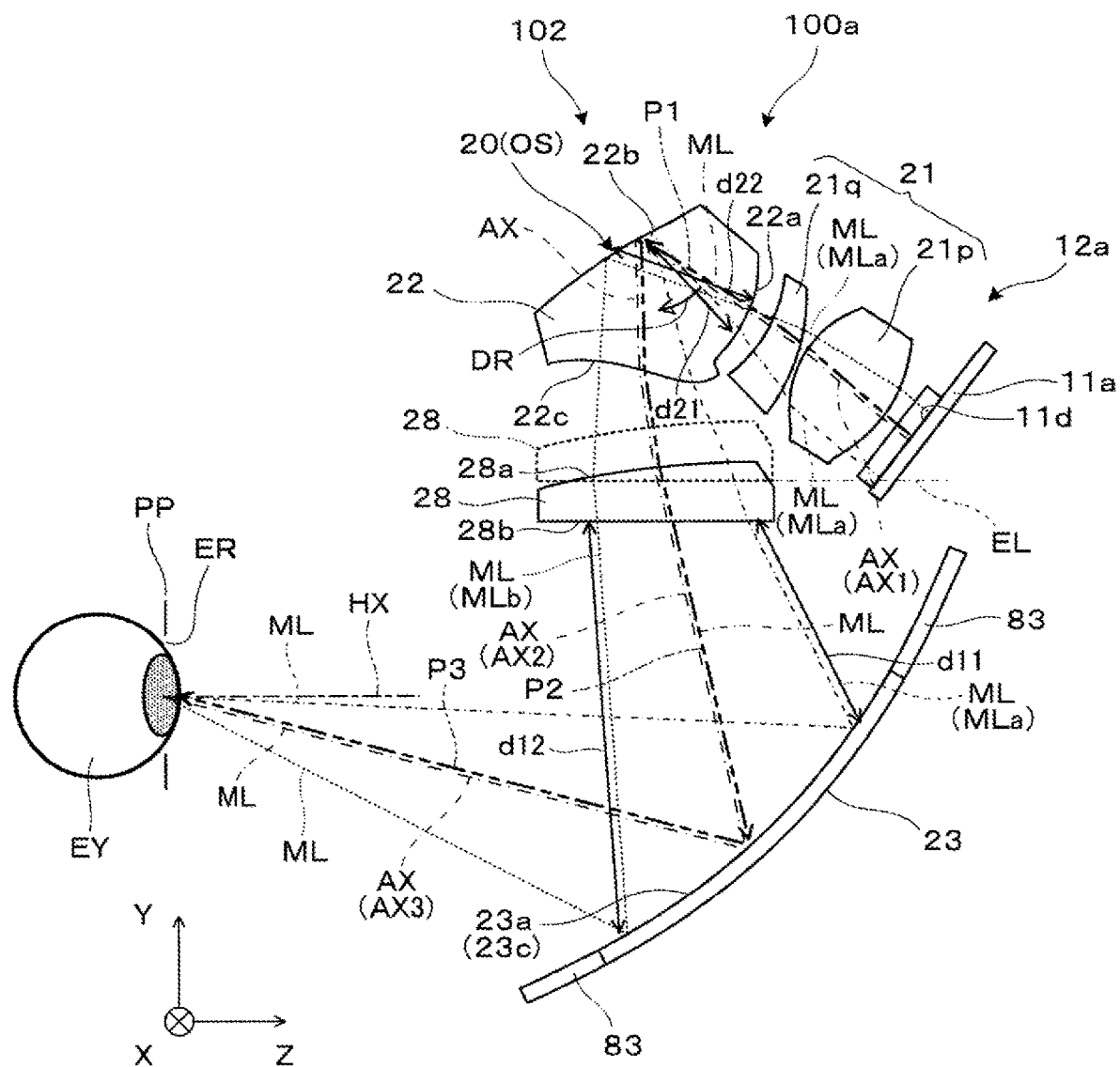
FIG. 6 is a side cross-sectional view illustrating a disposition relationship among optical elements constituting a first optical system.

The disposition relationship of the projection lens 21, the prism mirror 22, and the wedge type optical element 28 constituting the first optical system 12a will be described with reference to FIG. 6. As illustrated in the figure, compared to a distance d11 of a lower view angle light MLa indicated by a dot-dash line from the see-through mirror 23 to the wedge type optical element 28, a distance d12 of an upper view angle light MLb indicated by a dotted line from the see-through mirror 23 to the wedge type optical element 28 is longer, which causes eccentric aberration. In addition, in the prism mirror 22 as well, compared to a distance d21 of the lower view angle light MLa from the inner reflection portion 22b to the incident portion 22a of the prism, a distance d22 of the upper view angle light MLb from the inner reflection portion 22b to the incident portion 22a of the prism is longer, which causes eccentric aberration. At this time, in order to restrain the eccentric aberration generated by the wedge type optical element 28 and the like, it is sufficient that the optical path lengths of the lower view angle light MLa and the upper view angle light MLb are made as equal as possible. By inclining the optical axis portion AX1 in the direction of an arrow DR and reducing the angle formed between the optical axis portion AX1 and optical axis portion AX2, eccentric aberration can be suppressed. Reducing the angle formed by the optical axis portion AX1 and the optical axis portion AX2 in the inner reflection portion 22b in this way also has an effect of restraining the amount of protrusion in the anterior direction of the entire optical system. However, when the optical axis portion AX1 on the incident side of the prism mirror 22 is inclined in the direction of the arrow DR, the lower end of the first image element 11a approaches the see-through mirror 23 side. When the inclination of the optical axis portion AX1 is large in this way, if the wedge type optical element 28 is disposed near the emission portion 22c of the prism mirror 22 as indicated by the dotted line, the lower end of the first image element 11a is positioned below an extension line EL of the second surface 28b of the wedge type optical element 28. Thus, parts related to the structure for holding the wedge type optical element 28 or parts related to the outer packaging must avoid the first image element 11a. This complicates the structure of the parts, and further necessitates putting a part into the see-through visual field of the wearer US, leading to discomfort of the wearer US. Thus, the wedge type optical element 28 is lowered to the position indicated by a solid line to ensure that the lower end of the first image element 11a is not positioned below the extension line of the second surface 28b of the wedge type optical element 28. As a result, the wedge type optical element 28 is separated from the prism mirror 22 by a predetermined distance or more, and the distance in the optical axis direction between the prism mirror (first reflective optical member) 22 and the projection lens (front optical member) 21 is shorter than the distance in the optical axis direction between the prism mirror (first reflective optical member) 22 and the wedge type optical element (rear optical member) 28. In this case, even when the angular difference between the incident optical axis and the emission optical axis of the prism mirror 22, that is, the angle formed by the optical axis portion AX1 and the optical axis portion AX2 is reduced, the first image element 11a is less likely to interfere with the rear optical member in terms of disposition, and shape constraints on the first frame 61a and the like decrease, making it possible to simplify shapes. However, when the wedge type optical element 28 is brought closer to the see-through mirror 23, the see-through visual field angle is narrowed. In the configuration of the present embodiment, the position of the wedge type optical element 28 is lowered while ensuring a see-through visual field angle of approximately 15° to 20° in the upward direction. This makes it possible to suppress eccentric aberration and suppress the amount of protrusion in the anterior direction of the optical system at the same time, which simplifies the structure of parts holding the wedge type optical element 28, reduces the discomfort of the wearer US, and ensures the necessary see-through visual field angle.

However, lowering the wedge type optical element 28 to increase the spacing between the wedge type optical element 28 and the prism mirror 22 makes it not easy to directly join the wedge type optical element 28 and the prism mirror 22, and also makes it not easy to ensure positioning accuracy. In particular, it is assumed that unless the prism mirror 22 having the inner reflection portion 22b is positioned with high accuracy relative to the wedge type optical element 28 and the projection lens 21, optical performance degrades due to misalignment. In particular, increasing the positioning accuracy of the prism mirror 22 and the wedge type optical element 28 in the direction along the Y-X plane, which is the eccentric direction, is important from the viewpoint of ensuring optical performance of the entire first optical system 12a including the projection lens 21, the prism mirror 22, and the wedge type optical element 28. In addition, strength against assembly, drop impact, or the like is also required of the first optical system 12a. Thus, the wedge type optical element 28 and the prism mirror 22 are assembled with the barrel 31 illustrated in FIG. 3 therebetween.

The barrel 31 illustrated in FIG. 3 is coupled to the see-through mirror 23 or the first combiner 103a via the first frame 61a. The barrel 31 is disposed between the prism mirror 22 that is the first reflective optical member and the first combiner that is the second reflective optical member, and functions as a supporting member that positions the prism mirror (first reflective optical member) 22 relative to the first combiner (second reflective optical member) 103a. Note that the projection lens 21 is disposed on the first image element 11a side of the prism mirror 22 as the front optical member, and the projection lens (front optical member) 21 is fixed in a state of being positioned relative to the prism mirror 22. As described above, because the angle formed between the optical axis portion AX1 and the optical axis portion AX2 at the reflection portion 22b of the prism mirror 22 is reduced, the barrel (supporting member) 31 has an opening OP on the incident portion 22a side of the prism mirror 22. In other words, the opening OP increases the degree of freedom of disposition, makes it possible to reduce the angular difference between the optical axis portion (incident optical axis) AX1 and the optical axis portion (emission optical axis) AX2 of the first reflective optical member, and makes it possible to dispose the projection lens (front optical member) 21 closer to the emission portion 22c of the prism mirror 22 and the wedge type optical element (rear optical member) 28. As a result, shape constraints on parts related to the structure or the outer packaging decrease, making it possible to simplify shapes. On the other hand, the wedge type optical element 28 is disposed on the first combiner 103a side of the prism mirror 22 as the rear optical member, and the wedge type optical element (rear optical member) 28 is fixed in a state of being positioned relative to the prism mirror 22. The first combiner (second reflective optical member) 103a is fixed in a state of being positioned relative to the first frame 61a, which is a frame member. The first frame (frame member) 61a supports the barrel (supporting member) 31 via the wedge type optical element 28.

With reference to FIGS. 3 and 4, a flange portion around the inner reflection portion 22b is used for the positioning and fixing of the prism mirror 22. This is because the optical path is folded back at the inner reflection portion 22b, and the position of the inner reflection portion 22b affects accuracy the most compared to the other refractive surfaces 22a and 22c. For the positioning and fixing of the prism mirror 22, it is necessary to reduce rotational shift and position shift. In particular, since the prism mirror 22 has a reflection portion, rotational shift may be reduced for all axes. Since the prism mirror 22 constitutes an off-axis optical system OS, it is necessary to preferentially reduce position shift in a specific direction in which the axis is off.

First, the rotational shift of the prism mirror 22 will be described. Consider two directions that intersect each other in the Y-Z plane along a first imaginary plane VP1 including the optical axis AX of the image light ML incident on the incident portion 22a of the prism mirror 22 and the optical axis AX of the image light ML emitted from the emission portion 22c, and the X direction corresponding to the normal line direction of the first imaginary plane VP1. The adjustment of the rotational posture in the two directions intersecting each other in the Y-Z plane (for example, the Y direction and the Z direction) and in the X direction, that is, the positioning in relation to the angle in the X direction and the angle in the two directions that intersect each other in the Y-Z plane is very important since it greatly affects the resolution performance and distortion. To describe specifically, in a case in which the rotational shift of the prism mirror 22 occurs around an axis parallel to the X direction and the positioning accuracy in relation to the angle around the X-axis deteriorates, when attention is focused on the main beam that is a central view angle light, for example, the incident angle on the inner reflection portion 22b changes, and the optical axis shift occurs. In addition, this affects not only the central view angle light but also any other view angle light, decreasing the resolution performance of the entire optical system as a whole and generating distortion. A case in which the positioning accuracy in relation to the angle around the X-axis deteriorates has been described above. However, the same applies to a case in which the positioning accuracy in relation to the angle around the Y-axis or the Z-axis deteriorates. Thus, it is necessary to improve the positioning accuracy of the prism mirror 22 in relation to rotation in the three axial directions.

The position shift of the prism mirror 22 will be described. When comparing the two directions that intersect each other in the Y-Z plane along the first imaginary plane VP1 including the optical axis AX of the image light ML before and after the incidence on the prism mirror 22, and the X direction corresponding to the normal line direction of the first imaginary plane VP1, the positioning accuracy needs to be increased more in the two directions that intersect each other in the Y-Z plane in connection with the optical characteristics of the prism mirror 22. To describe specifically, since it is an off-axis optical system OS, the imaging optical system 20 including the prism mirror 22 is an optical system in which optical components are decentered and tilted in the Y-Z direction, or a free form surface or the like is used. Therefore, in a case in which position shift of the prism mirror 22 occurs in a direction parallel to the Y-Z plane, when attention is focused on the main beam that is the central view angle light, for example, the incident position on the inner reflection portion 22b changes in the Y-Z plane, causing not only position change within the Y-Z plane but also a relatively large angular change in accordance with the position shift. Therefore, it is necessary to increase the positioning accuracy of the prism mirror 22 in the two directions intersecting each other in the Y-Z plane. On the other hand, since the imaging optical system 20 including the prism mirror 22 is axisymmetric with respect to the X direction, the necessary positioning accuracy of the prism mirror 22 is relatively low in the X direction compared to the two directions intersecting each other in the Y-Z plane.

Figure 7:
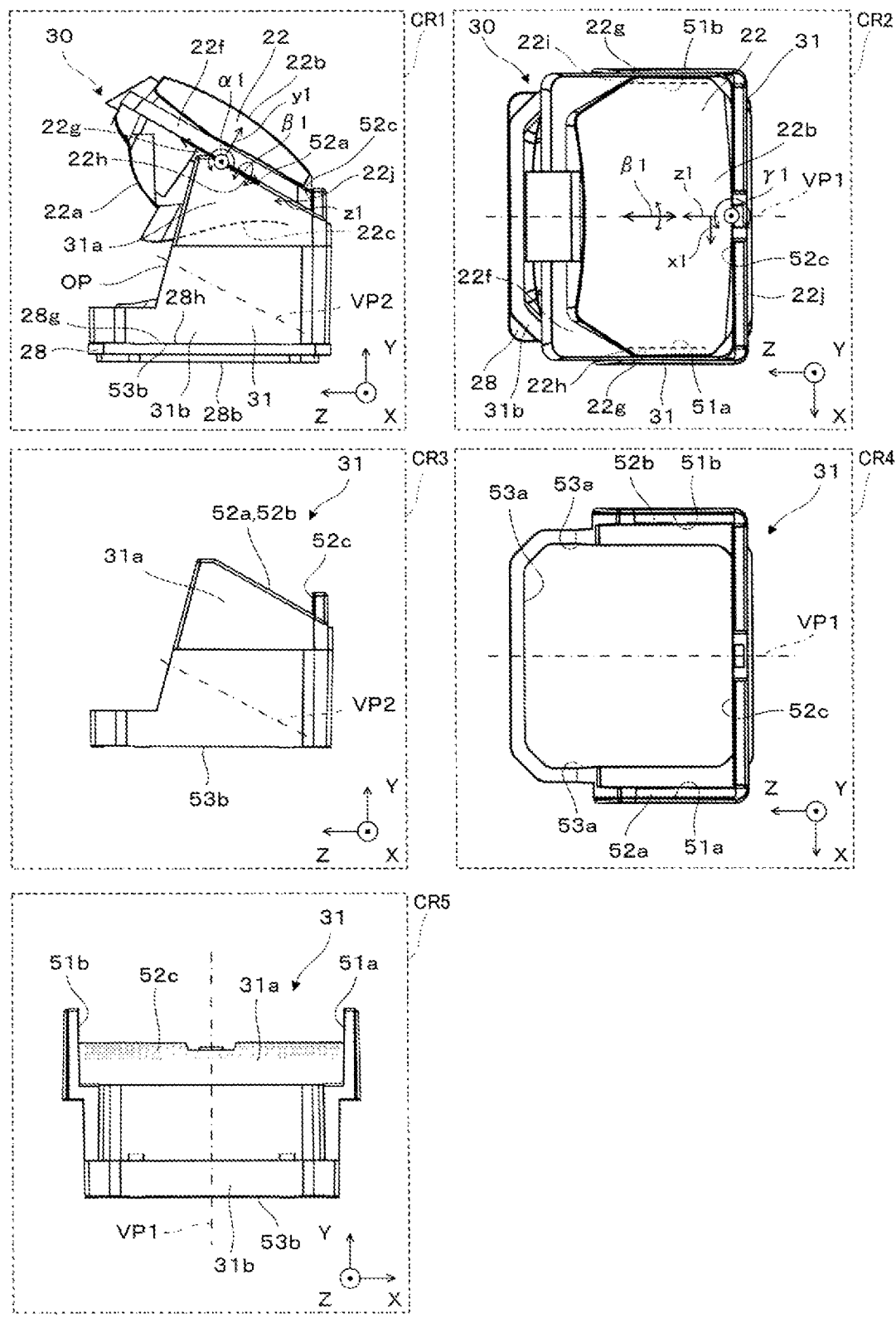
FIG. 7 is a set of views illustrating the positioning of a prism mirror relative to a barrel.
Figure 8:
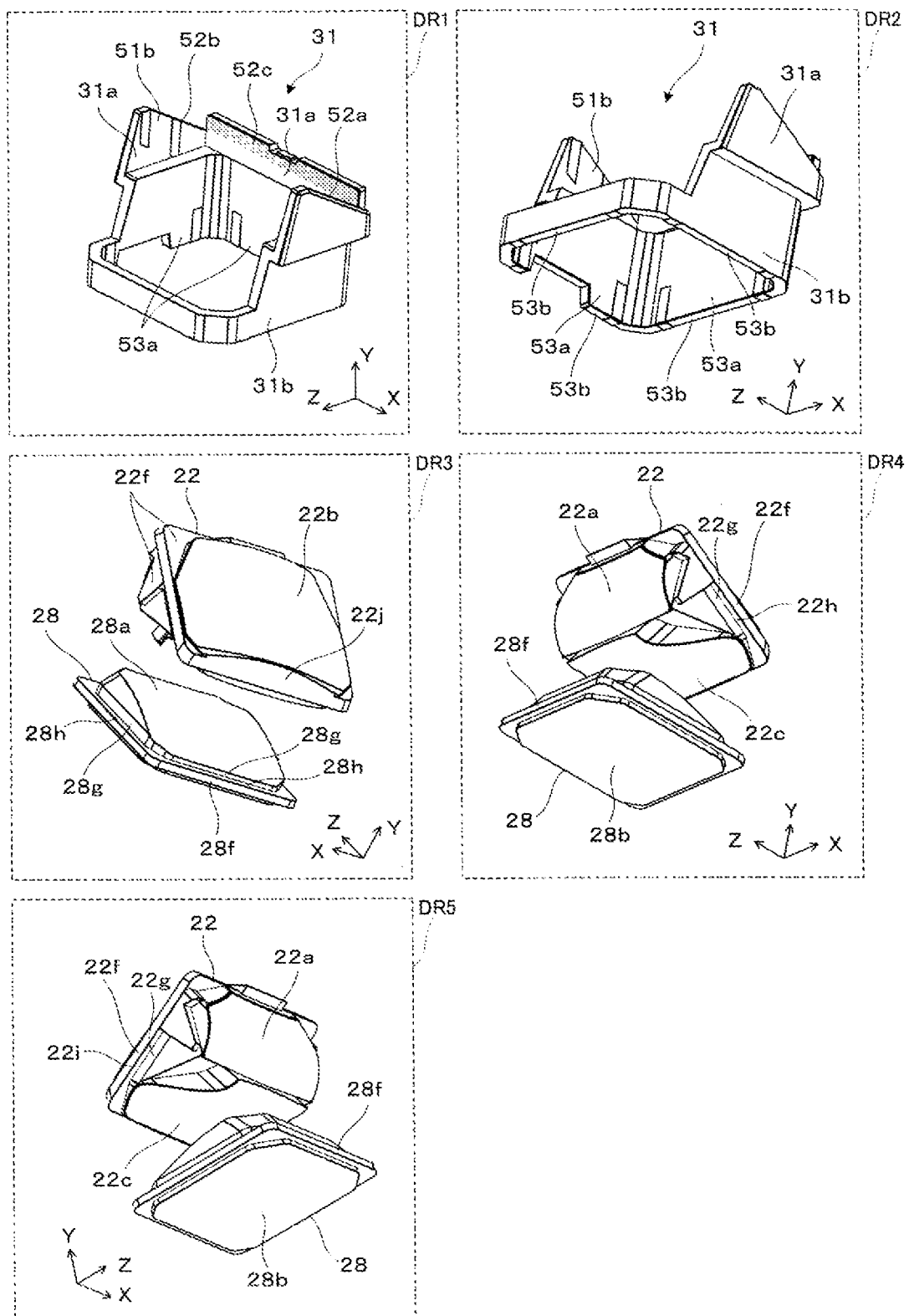

With reference to FIGS. 7 and 8, the fixing of the prism mirror 22 and the like to the barrel 31 will be described. In FIG. 7, a region CR1 is a side view of an optical block 30 integrated by the barrel 31, a region CR2 is a plan view of the optical block 30, a region CR3 is a side view of the barrel 31, a region CR4 is a plan view of the barrel 31, and a region CR5 is a front view of the barrel 31. In FIG. 8, a region DR1 and a region DR2 are perspective views of the barrel 31, and a region DR3, a region DR4, and a region DR5 are perspective views of the prism mirror 22 and the wedge type optical element 28. The prism mirror 22 is fixed in a state of being positioned relative to the barrel 31 by fitting and biasing.

An upper end 31a of the barrel 31 includes a first limiting portion 51a and a second limiting portion 51b that face a pair of side surfaces 22g extending in parallel with each other and formed at a flange portion 22f of the prism mirror 22 in a first direction x1 (that is, the X direction) parallel to the normal line of the first imaginary plane VP1. The first limiting portion 51a and the second limiting portion 51b extend in parallel with the Y-Z plane. The side surfaces 22g of the prism mirror 22 are disposed so as to be sandwiched between the first limiting portion 51a and the second limiting portion 51b of the barrel 31, whereby positioning in the first direction x1 is performed. In this manner, the prism mirror 22 is positioned in the first direction x1 relative to the barrel 31.

The upper end 31a of the barrel 31 includes a pair of first positioning portions 52a and 52b brought into contact with a pair of reference surfaces 22h and 22i formed at the flange portion 22f of the prism mirror 22 in a second direction y1 perpendicular to the first imaginary plane VP1 and parallel to the normal line of the second imaginary plane VP2 on which the image light ML emitted from the emission portion 22c of the prism mirror 22 is incident. In addition, the upper end 31a of the barrel 31 includes a second positioning portion 52c brought into contact with a reference surface 22j formed at the flange portion 22f of the prism mirror 22 in a third direction z1 perpendicular to the first direction x1 and intersecting the second direction y1. In this manner, the prism mirror 22 is positioned with high accuracy in the second direction y1 and the third direction z1 relative to the barrel 31. Note that the first direction x1, the second direction y1, and the third direction z1 are local coordinates related to the positioning of the prism mirror 22. The second direction y1 and the third direction z1 are perpendicular to the first direction x1. However, the second direction y1 and the third direction z1 are not necessarily perpendicular to each other.

In the above description, the pair of first positioning portions 52a and 52b are a pair of band-shaped flat surfaces that are spaced apart in the first direction x1 with the optical axis AX of the image light ML interposed therebetween and that extend in a direction perpendicular to the first direction x1 and the second direction y1. Since the pair of first positioning portions 52a and 52b extend in a direction perpendicular to the first direction x1 and the second direction y1, rotation of the prism mirror 22 about an axis α1 parallel to the first direction x1 can be restricted. In addition, since the pair of first positioning portions 52a and 52b are spaced apart in the first direction x1 with the optical axis AX interposed therebetween, rotation of the prism mirror 22 about an axis β1 perpendicular to the first direction x1 and the second direction y1 can be restricted. Further, the second positioning portion 52c is a band-shaped flat surface extending in the first direction x1. Accordingly, rotation of the prism mirror 22 about an axis γ1 perpendicular to the first direction x1 and the third direction z1 can be restricted by the second positioning portion 52c. In this manner, the rotational posture of the prism mirror 22 can be appropriately set in relation to the three axes of α1, β1, and γ1 that intersect one another.

The prism mirror 22 is in a state of being positioned relative to the upper end 31a of the barrel 31 by (1) being sandwiched between the first limiting portion 51a and the second limiting portion 51b for fitting and (2) being biased against the first positioning portions 52a and 52b and the second positioning portion 52c. While maintaining this positioned state, the prism mirror 22 is fixed to the barrel 31 using a photocurable adhesive, an ultrasonic welding method, or the like.

The wedge type optical element 28 is fixed in a state of being positioned relative to the barrel 31 by fitting. A flange portion 28f of the wedge type optical element 28 is fitted with a lower end 31b of the barrel 31. At this time, a stepped side surface 28g of the flange portion 28f faces a lateral limiting surface 53a formed along the inner circumference of the four sides of the barrel 31, while a stepped upper surface 28h of the flange portion 28f faces a lower limiting surface 53b formed along the lower end of the four sides of the barrel 31. Although detailed description is omitted, by a stepped fitting structure formed between the lower end 31b of the barrel 31 and the wedge type optical element 28, the wedge type optical element 28 is positioned in each of the X, Y, and Z directions and positioned in relation to rotation about each of the X-, Y-, and Z-axes.

The structure for positioning and fixing the prism mirror 22 and the wedge type optical element 28 constituting the first optical system 12a has been described above. The structure for positioning and fixing optical elements constituting the second optical system 12b is similar to the structure for positioning and fixing optical elements constituting the first optical system 12a.

Although detailed description is omitted, the structure for positioning and fixing the wedge type optical element 28 relative to the first frame 61a is similar to the structure for positioning and fixing the wedge type optical element 28 relative to the barrel 31, and uses a stepped fitting structure.

Figure 9:
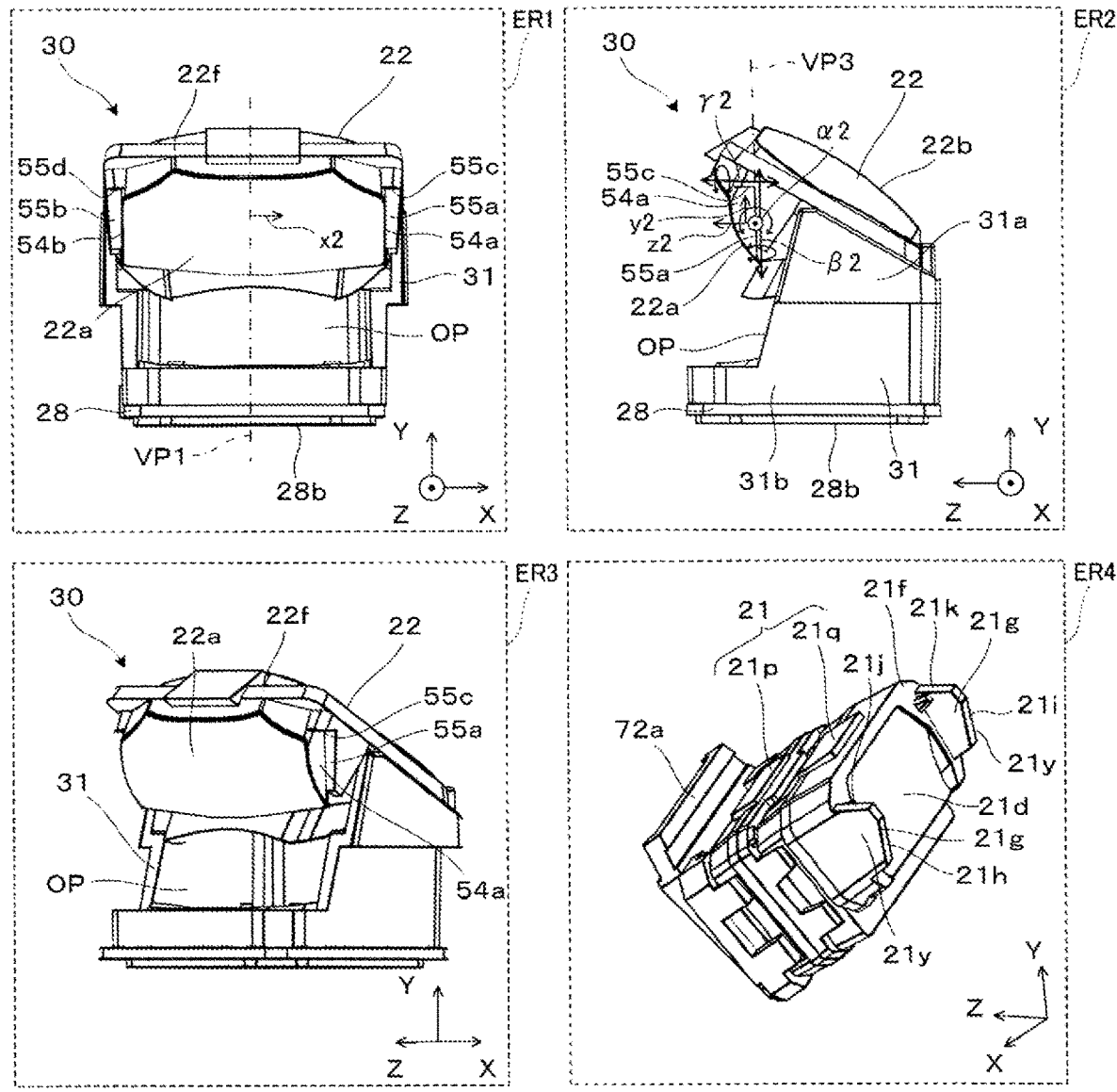
FIG. 9 is a set of views illustrating the positioning of a projection lens relative to a prism mirror.

With reference to FIG. 9, the fixing of the projection lens 21 to the prism mirror 22 will be described. In FIG. 9, a region ER1 is a front view of the optical block 30, a region ER2 is a side view of the optical block 30, a region ER3 is a perspective view of the optical block 30, and a region ER4 is a perspective view of the projection lens 21. The projection lens 21 is fixed in a state of being positioned relative to the prism mirror 22 of the optical block 30 by fitting and biasing.

The prism mirror 22 includes a third limiting surface 54a and a fourth limiting surface 54b that face a pair of inner surfaces 21g extending in parallel with each other and formed at a flange portion 21f of the second lens 21q, which constitutes the rear stage of the projection lens 21, in a first direction x2 (that is, the X direction) parallel to the normal line of the first imaginary plane VP1. The third limiting surface 54a and the fourth limiting surface 54b extend in parallel with the Y-Z plane. A pair of claws 21y formed at the flange portion 21f of the second lens 21q are disposed so that the inner surfaces 21g of the claws 21y sandwich the third limiting surface 54a and the fourth limiting surface 54b of the prism mirror 22, whereby positioning in the first direction x1 is made possible. In this manner, the projection lens 21 is positioned in the first direction x1 relative to the prism mirror 22, that is, the optical block 30.

The prism mirror 22 includes a pair of third positioning surfaces 55a and 55b brought into contact with a pair of reference surfaces 21h and 21i formed on the pair of claws 21y provided at the second lens 21q in a fourth direction z2 perpendicular to the first imaginary plane VP1 and parallel to the normal line of a third imaginary plane VP3 on which the image light ML emitted from the emission portion 21d of the projection lens 21 is incident. In addition, the prism mirror 22 has a pair of fourth positioning surfaces 55c and 55d brought into contact with reference surfaces 21j and 21k formed on the pair of claws 21y provided at the second lens 21q in a fifth direction y2 perpendicular to the first direction x2 and intersecting the fourth direction z2. In this manner, the projection lens 21 is positioned with high accuracy in the fourth direction z2 and the fifth direction y2 relative to the prism mirror 22. Note that the first direction x2, the fourth direction z2, and the fifth direction y2 are local coordinates related to the positioning of the projection lens 21. The fourth direction z2 and the fifth direction y2 are perpendicular to the first direction x2. However, the fourth direction z2 and the fifth direction y2 are not necessarily perpendicular to each other. In addition, the fourth direction z2 may be the same direction as the third direction z1.

In the above description, the pair of third positioning surfaces 55a and 55b are a pair of band-shaped flat surfaces that are spaced apart in the first direction x2 with the optical axis AX of the image light ML interposed therebetween and that extend in a direction perpendicular to the first direction x2 and the fourth direction z2. Since the pair of third positioning surfaces 55a and 55b extend in a direction perpendicular to the first direction x2 and the fourth direction z2, rotation of the projection lens 21 about an axis α2 parallel to the first direction x2 can be restricted. In addition, since the pair of third positioning surfaces 55a and 55b are spaced apart in the first direction x2 with the optical axis AX interposed therebetween, rotation of the second lens 21q or the projection lens 21 about an axis β2 perpendicular to the first direction x2 and the fourth direction z2 can be restricted. Further, the fourth positioning surfaces 55c and 55d are a pair of flat surfaces spaced apart in the first direction x2 with the optical axis AX of the image light ML interposed therebetween. Accordingly, rotation of the second lens 21q or the projection lens 21 about an axis γ2 perpendicular to the first direction x2 and the fifth direction y2 can be restricted by the fourth positioning surfaces 55c and 55d. In this manner, the rotational posture of the projection lens 21 can be appropriately set in relation to the three axes of α2, β2, and γ2 that intersect one another.

The projection lens 21 is in a state of being positioned relative to the flange portion 22f of the prism mirror 22 by (1) sandwiching the third limiting surface 54a and the fourth limiting surface 54b for fitting and (2) being biased against the third positioning surfaces 55a and 55b and the fourth positioning surfaces 55c and 55d. While maintaining this positioned state, the projection lens 21 is fixed to the prism mirror 22 using a photocurable adhesive, an ultrasonic welding method, or the like.

Figure 10:
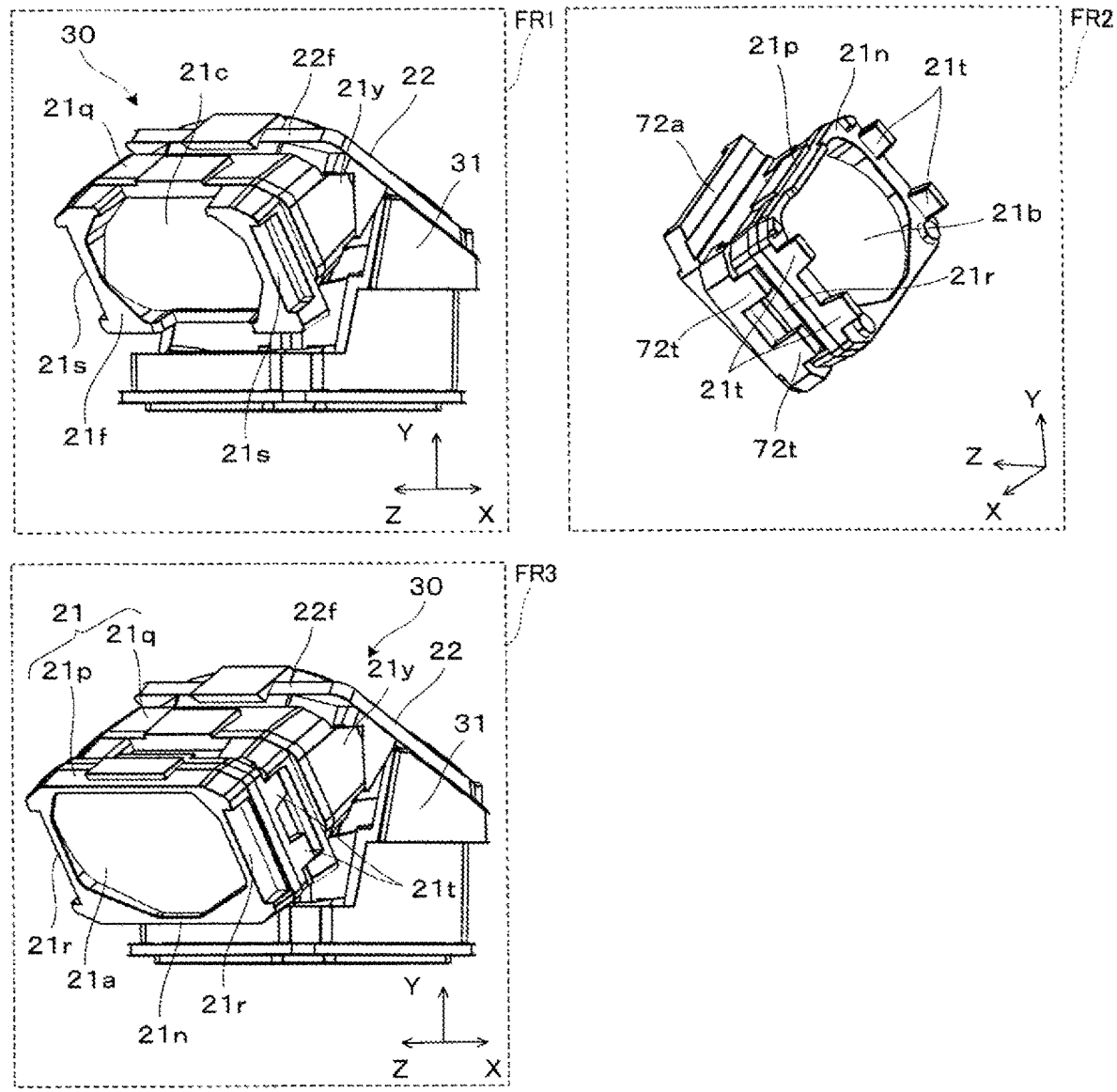
FIG. 10 is a set of views illustrating the positioning between lenses in a projection lens.

With reference to FIG. 10, the fixing and the like of the first lens 21p and the second lens 21q in the projection lens 21 will be described. In FIG. 10, a region FR1 is a perspective view illustrating a state in which the first lens 21p and the like are removed from the first optical system 12a, a region FR2 is a perspective view illustrating the first lens 21p and the like, and a region FR3 is a perspective view illustrating a state in which the first holder 72a is removed from the first optical system 12a. The first lens 21p and the second lens 21q are positioned by fitting and fixed. At this time, a plurality of claws 21t formed at a flange portion 21n of the first lens 21p sandwich a plurality of recesses 21s formed in the second lens 21q to grip the flange portion 21f of the second lens 21q, whereby positioning is performed. Note that the first holder 72a and the first lens 21p are fixed in a state of being positioned by fitting. At this time, a plurality of claws 72t formed at the first holder 72a sandwich a plurality of recesses 21r formed in the first lens 21p to grip the flange portion 21f of the second lens 21q, whereby positioning is performed.

A photocurable adhesive, an ultrasonic welding method, or the like can be used to join the first lens 21p and the second lens 21q. The projection lens 21 can be assembled and integrated before being coupled to the prism mirror 22, but the manufacturing procedure is not limited thereto.

Figure 11:
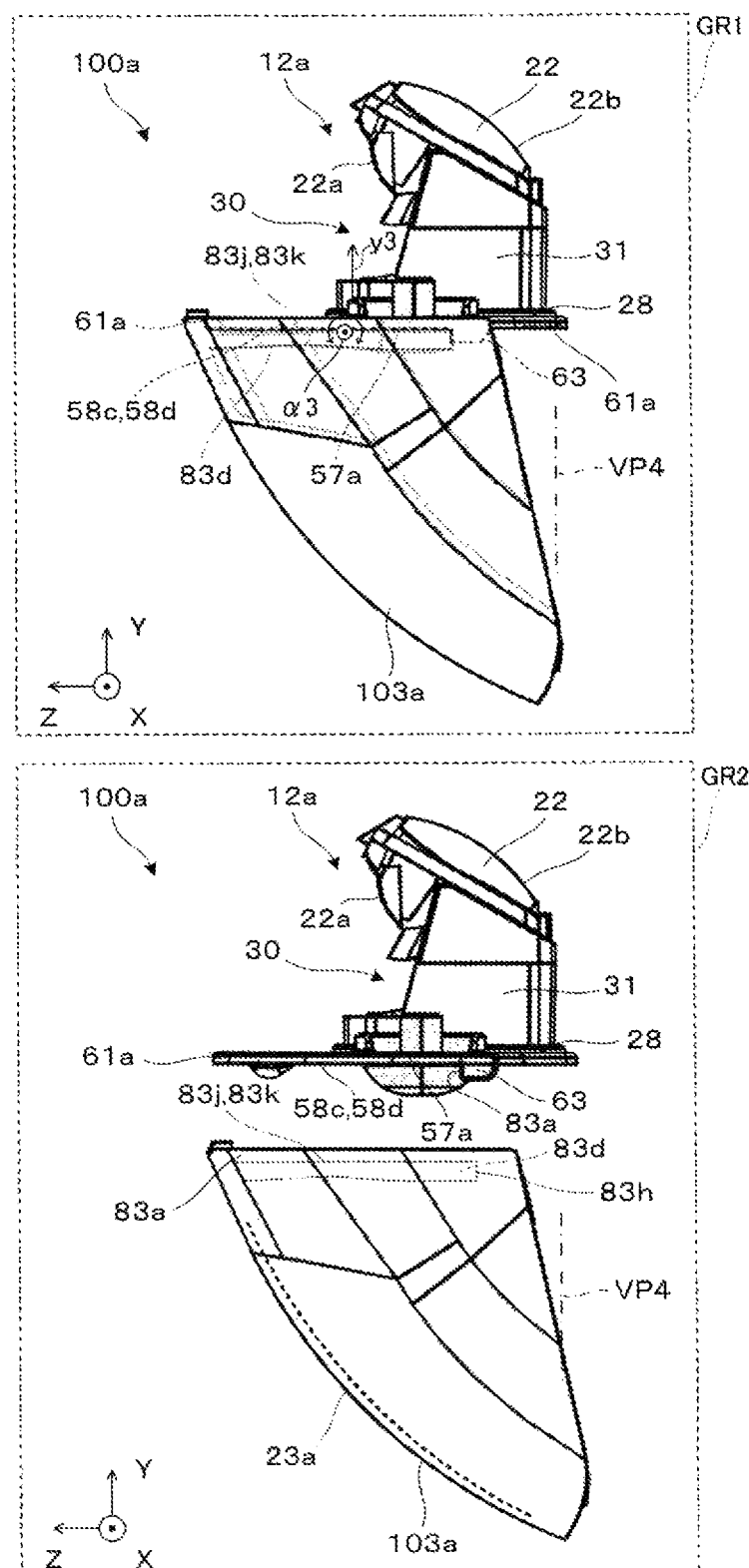
FIG. 11 is a set of views illustrating the positioning of a combiner relative to a frame.
Figure 12:
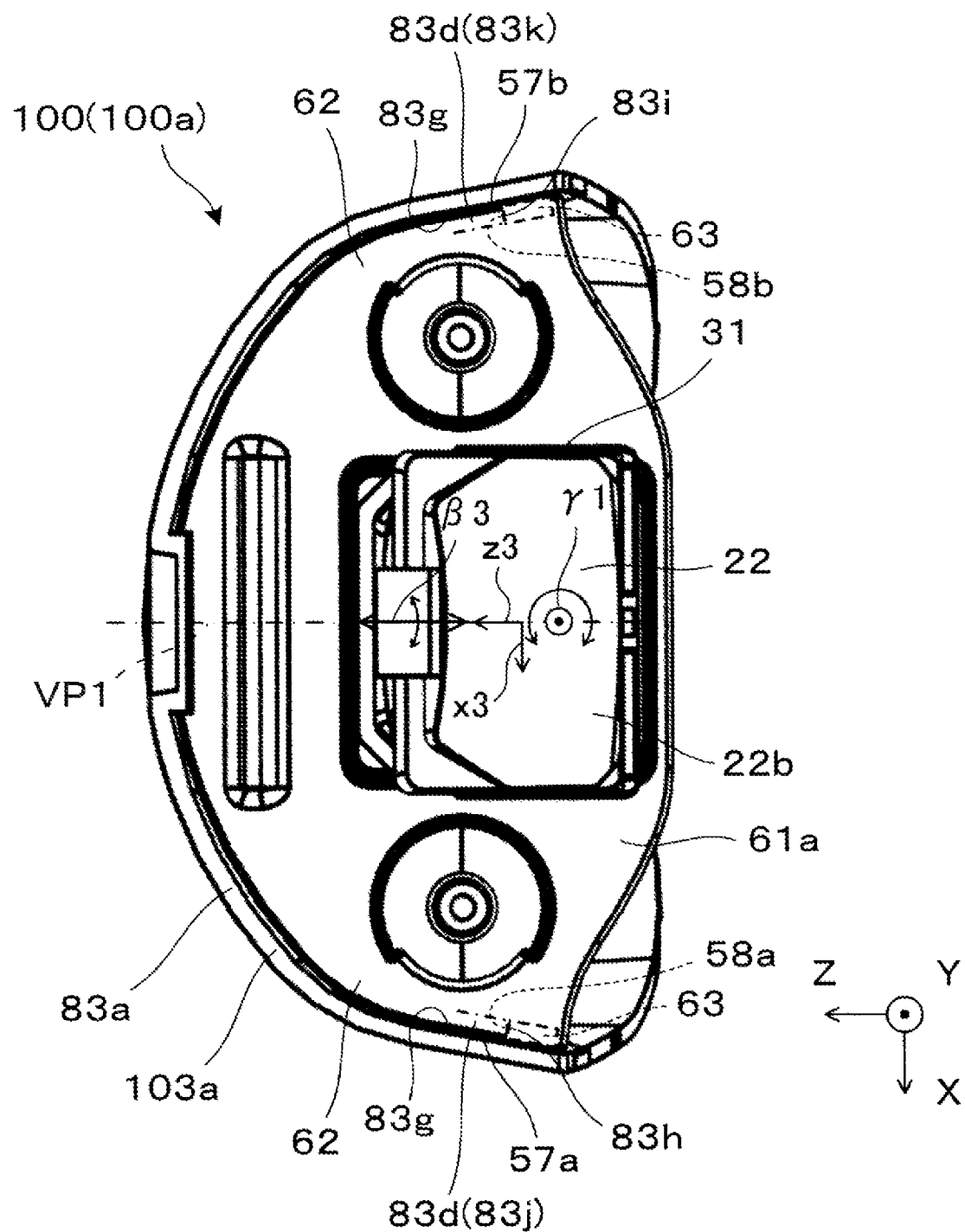
FIG. 12 is a plan view illustrating the positioning of a combiner relative to a frame.

With reference to FIGS. 11 and 12, the fixing of the see-through mirror 23 or the first combiner 103a to the first frame 61a will be described. In FIG. 11, a region GR1 is a side view illustrating a portion of the first display device 100a, and a region GR2 is an exploded side view illustrating a portion of the first display device 100a. The first combiner 103a is fixed in a state of being positioned relative to the plate-shaped first frame 61a, which supports the optical block 30, by fitting and biasing.

The first frame 61a includes, at an outer circumferential portion 62, a fifth limiting surface 57a and a sixth limiting surface 57b that are symmetrically slightly inclined in opposite directions in the X-Z plane relative to a first direction x3 (that is, the X direction) parallel to the normal line of the first imaginary plane VP1. An upper end 83a of the first combiner 103a is disposed so that the inner surface 83g of the first combiner 103a sandwiches the fifth limiting surface 57a and the sixth limiting surface 57b of the first frame 61a, whereby positioning in the first direction x3 is performed. In this manner, the first combiner 103a is positioned in the first direction x3 relative to the first frame 61a.

The first frame 61a includes a pair of protuberances 63 on the lower surface side of the left and right ends. The pair of protuberances 63 include, in a sixth direction z3 perpendicular to the first imaginary plane VP1 and parallel to the normal line of a fourth imaginary plane VP4 on which the image light ML emitted from the reflection portion 23a of the first combiner 103a is incident, a pair of fifth positioning surfaces 58a and 58b brought into contact with a pair of reference surfaces 83h and 83i formed at the rear ends of a rib 83d, which is provided on the inner side of the upper end 83a of the first combiner 103a. In addition, the outer circumferential portion 62 of the first frame 61a includes a pair of sixth positioning surfaces 58c and 58d brought into contact with reference surfaces 83j and 83k formed on the rib 83d of the first combiner 103a in a seventh direction y3 perpendicular to the first direction x3 and intersecting the sixth direction z3. In this manner, the first combiner 103a is positioned with high accuracy in the sixth direction z3 and the seventh direction y3 relative to the first frame 61a. Note that the first direction x3, the sixth direction z3, and the seventh direction y3 are local coordinates related to the positioning of the first combiner 103a. The sixth direction z3 and the seventh direction y3 are perpendicular to the first direction x3. However, the sixth direction z3 and the seventh direction y3 are not necessarily perpendicular to each other. In addition, the sixth direction z3 may be the same direction as the third direction z1 and the fourth direction z2. The seventh direction y3 may be the same direction as the fifth direction y2.

In the above description, the pair of fifth positioning surfaces 58a and 58b are a pair of flat surfaces spaced apart in the first direction x3 with the optical axis AX of the image light ML interposed therebetween. Accordingly, rotation of the first combiner 103a about an axis γ3 perpendicular to the first direction x3 and the sixth direction z3 can be restricted by the fifth positioning surfaces 58a and 58b. In addition, the pair of sixth positioning surfaces 58c and 58d are a pair of band-shaped flat surfaces that are spaced apart in the first direction x3 with the optical axis AX of the image light ML interposed therebetween and that extend in directions that are symmetrically slightly inclined in opposite directions in the X-Z plane relative to the sixth direction z3. In this way, since the pair of sixth positioning surfaces 58c and 58d extend substantially in the sixth direction z3, rotation of the first combiner 103a about an axis α3 parallel to the first direction x3 can be restricted. Further, the fifth positioning surfaces 58a and 58b are spaced apart in the first direction x3 with the optical axis AX of the image light ML interposed therebetween. Accordingly, rotation of the first combiner 103a about an axis β3 perpendicular to the first direction x3 and the seventh direction y3 can be restricted by the fifth positioning surfaces 58a and 58b. In this manner, the rotational posture of the first combiner 103a can be appropriately set in relation to the three axes of α3, β3, and γ3 that intersect one another.

The first combiner 103a is in a state of being positioned relative to the outer circumferential portion 62 of the first frame 61a by (1) sandwiching the fifth limiting surface 57a and the sixth limiting surface 57b for fitting and (2) being biased against the fifth positioning surfaces 58a and 58b and the sixth positioning surfaces 58c and 58d. While maintaining this positioned state, the first combiner 103a is fixed to the first frame 61a using a photocurable adhesive, an ultrasonic welding method, or the like.

The structure for positioning and fixing optical elements constituting the first display device 100a such as the prism mirror 22 has been described above. The structure for positioning and fixing optical elements constituting the second display device 100b is also similar to the structure for positioning and fixing optical elements constituting the first display device 100a.

Figure 13:
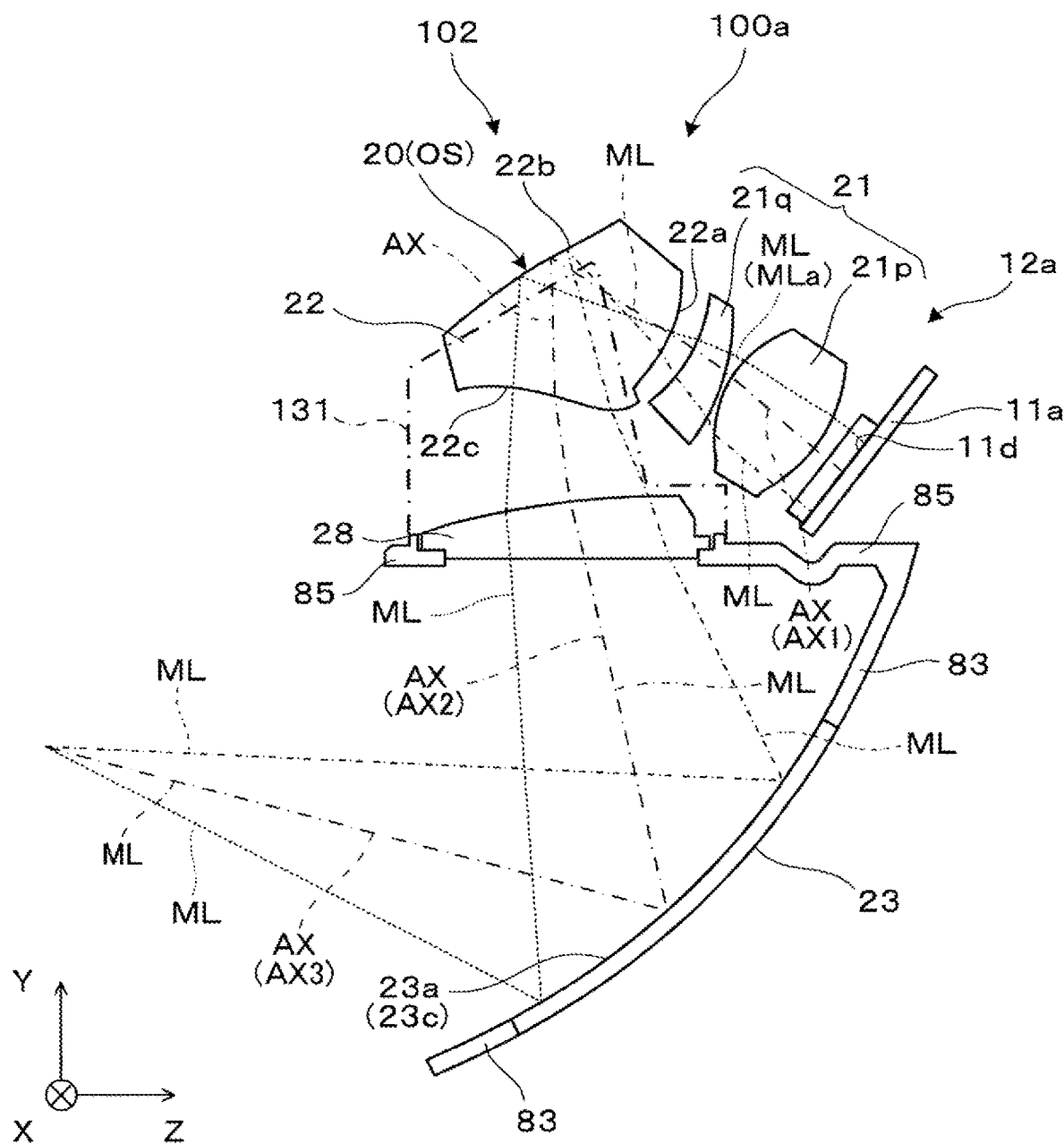
FIG. 13 is a side cross-sectional view illustrating an optical module according to a modified example.

FIG. 13 is a side cross-sectional view illustrating a modified example of the first display device 100a according to a modified example. In this case, the first combiner 103a has a structure in which the supporting member is integrated, and a support frame 85 coupled to the support plate 83 supports the wedge type optical element 28. A support portion 131 corresponding to the barrel 31 may be integrally added to the support frame 85. In this case, the wedge type optical element 28 and the prism mirror 22 can be directly positioned relative to the first combiner 103a and fixed. Note that the support frame 85 and the support portion 131 can be integrated, and the prism mirror 22 and the first combiner 103a can be fixed thereto by a technique similar to those described above.

The optical module 100 or HMD 201 according to an embodiment described above includes: image elements 11a and 11b; the prism mirrors (first reflective optical members) 22 that cause the image light ML emitted from the image elements 11a and 11b to be incident on the incident portions 22a, to be reflected by the inner reflection portions 22b, and to be emitted from the emission portions 22c; the combiners (second reflective optical members) 103a and 103b that reflect the image light ML from the prism mirrors 22 toward the pupil positions; and the barrels (supporting members) 31 that are disposed between the prism mirror 22 and the combiner 103a and between the prism mirror 22 and the combiner 103b and that position the prism mirrors 22; wherein the prism mirrors 22 each emit the image light ML from the emission portion in a direction intersecting the optical axis of the image light ML incident on the incident portion as seen from the first direction x1 parallel to the normal line of the first imaginary plane VP1 including the optical axis portion AX1 of the image light ML incident on the incident portion 22a and the optical axis portion AX2 of the image light ML emitted from the emission portion 22c, the barrels 31 each include the first limiting portion 51a and the second limiting portion 51b facing the prism mirror 22 in the first direction x1, and the barrels 31 each include the first positioning portions 52a and 52b brought into contact with the prism mirror 22 in the second direction y1 perpendicular to the first imaginary plane VP1 and parallel to the normal line of the second imaginary plane VP2 on which the image light ML emitted from the emission portion of the prism mirror 22 is incident, and the second positioning portion 52c brought into contact with the prism mirror 22 in the third direction z1 perpendicular to the first direction x1 and intersecting the second direction y1. In this optical module 100 or HMD 201, the disposition of the prism mirror 22 in the first direction x1 is restricted by the first limiting portion 51a and the second limiting portion 51b, alignment in the second direction y1 is performed by the first positioning portions 52a and 52b, and alignment in the third direction z1 is performed by the second positioning portion 52c, whereby a three-dimensional disposition is set for the prism mirror 22. This optical module 100 is an off-axis system, that is, an off-axis optical system OS when seen from the first direction x1. However, in the second direction y1 and the third direction z1 in which influence on accuracy is relatively large because the optical module 100 is an off-axis optical system OS, the prism mirror 22 is positioned using the first positioning portions 52a and 52b and the second positioning portion 52c, which makes it possible to minimize deterioration in imaging accuracy caused by position shift of the prism mirror 22.

MODIFIED EXAMPLES AND OTHERS

The present disclosure has been described above according to embodiments. However, the present disclosure is not limited to the above-described embodiments, and can be carried out in various aspects without departing from the gist of the present disclosure. For example, the following modifications can also be carried out.

The imaging optical system 20 that is incorporated into the first display device 100a is not limited to those illustrated in the drawings, and can have a variety of configurations. Specifically, the imaging optical system 20 described above is an off-axis optical system OS that is asymmetric in the Y direction or the longitudinal direction. However, the imaging optical system 20 can also be an off-axis optical system that is asymmetric in the X direction or the transverse direction. For optical elements constituting the imaging optical system 20 as well, those illustrated in FIG. 4 are mere examples. Thus, changes can be made thereto, such as increasing or decreasing the number of lenses, adding a mirror, and adding a light-guiding member.

A light control device that controls light by limiting transmitted light of the combiners 103a and 103b may be attached on the outside world side of the combiners 103a and 103b. The light control device adjusts transmittance, for example, electrically. Mirror liquid crystals, electronic shades, and the like can be used as the light control device. The light control device may be one that adjusts transmittance in accordance with outside light illuminance.

The combiners 103a and 103b can be replaced with a mirror having a light-shielding property. In this case, the optical system is a non-see-through type optical system that does not presuppose direct observation of the outside image.

The projection lens 21 is fitted with the prism mirror 22 in the first direction. However, the projection lens 21 or the prism mirror 22 may be provided with a positioning surface and positioned so as to be biased in the first direction.

An optical module according to a specific aspect includes: an image element; a first reflective optical member configured to cause image light emitted from the image element to be incident on an incident portion, to be reflected by an inner reflection portion, and to be emitted from an emission portion; a second reflective optical member configured to reflect the image light from the first reflective optical member toward a pupil position; and a supporting member disposed between the first reflective optical member and the second reflective optical member and configured to position the first reflective optical member; wherein the first reflective optical member emits the image light from the emission portion in a direction intersecting an optical axis of the image light incident on the incident portion as seen from a first direction parallel to a normal line of a first imaginary plane including the optical axis of the image light incident on the incident portion and an optical axis of the image light emitted from the emission portion, the supporting member includes a first limiting portion and a second limiting portion facing the first reflective optical member in the first direction, and the supporting member includes a first positioning surface brought into contact with the first reflective optical member in a second direction perpendicular to the first imaginary plane and parallel to a normal line of a second imaginary plane on which the image light emitted from the emission portion of the first reflective optical member is incident, and a second positioning portion brought into contact with the first reflective optical member in a third direction perpendicular to the first direction and intersecting the second direction.

In the optical module described above, the disposition of the first reflective optical member in the first direction is restricted by the first limiting portion and the second limiting portion, alignment in the second direction is performed by the first positioning surface, and alignment in the third direction is performed by the second positioning portion, whereby a three-dimensional disposition is set for the first reflective optical member. This optical module is an off-axis system when seen from the first direction. However, in the second direction and the third direction in which influence on accuracy is relatively large because the optical module is an off-axis system, the first reflection optical member is positioned using the first positioning surface and the second positioning portion, which makes it possible to minimize deterioration in imaging accuracy caused by position shift of the first reflection optical member.

In a specific aspect, the first positioning portions include a pair of band-shaped flat surfaces that are spaced apart in the first direction with the optical axis of the image light interposed therebetween and that extend perpendicular to the first direction and the second direction. In this case, rotation of the first reflective optical member about an axis parallel to the first direction can be restricted by the first positioning portions. In addition, rotation of the first reflective optical member about an axis perpendicular to the first direction and the second direction can be restricted by the pair of first positioning portions. In this manner, the rotational posture of the first reflective optical member can be appropriately set.

In a specific aspect, the second positioning portion includes a band-shaped flat surface extending in the first direction. In this case, rotation of the first reflective optical member about an axis perpendicular to the first direction and the third direction can be restricted by the second positioning portion.

In a specific aspect, the optical module further includes a rear optical member disposed between the first reflective optical member and the second reflective optical member, wherein the supporting member supports the rear optical member on the opposite side in the second direction of the first reflective optical member. The rear optical member has a role of improving the imaging state in relation to distortion aberration and the like.

In a specific aspect, the optical module further includes a front optical member disposed between the image element and the first reflective optical member, wherein a distance in the optical axis direction between the first reflective optical member and the front optical member is shorter than a distance in the optical axis direction between the first reflective optical member and the rear optical member. In this case, even when the angular difference between the incident optical axis and the emission optical axis of the first reflective optical member is reduced, the front optical member is less likely to interfere with the emission portion of the first reflective optical member or the rear optical member in terms of disposition, and shape constraints on parts related to the structure or the outer packaging decreases, making it possible to simplify shapes.

In a specific aspect, the first reflective optical member includes a third positioning surface brought into contact with the front optical member in a fourth direction perpendicular to the first imaginary plane and parallel to a normal line of a third imaginary plane on which the image light emitted from the emission portion of the front optical member is incident, and a fourth positioning surface brought into contact with the front optical member in a fifth direction perpendicular to the first direction and intersecting the fourth direction. In this case, a virtual image can be formed in which aberration is restrained by the front optical member. Further, in the fourth direction and the fifth direction in which influence on accuracy is relatively large because the optical module is an off-axis system, the front optical member is positioned using the third positioning surface and the fourth positioning surface, which makes it possible to minimize deterioration in imaging accuracy caused by position shift of the front optical member.

In a specific aspect, the third positioning surfaces include a pair of band-shaped flat surfaces that are spaced apart in the first direction with the optical axis interposed therebetween and that extend perpendicular to the first direction and the fourth direction. In this case, rotation of the front optical member about an axis parallel to the first direction can be restricted by the third positioning surfaces. In addition, rotation of the front optical member about an axis perpendicular to the first direction and the fourth direction can be restricted by the pair of third positioning surfaces. In this manner, the rotational posture of the front optical member can be appropriately set.

In a specific aspect, the fourth positioning surfaces include a pair of flat surfaces spaced apart in the first direction with the optical axis of the image light interposed therebetween. In this case, rotation of the front optical member about an axis perpendicular to the first direction and the fifth direction can be restricted by the fourth positioning surfaces. In this manner, the rotational posture of the front optical member can be appropriately set.

In a specific aspect, the supporting member opens on the incident portion side of the first reflective optical member. In this case, the angular difference between the incident optical axis and the emission optical axis of the first reflective optical member can be reduced to dispose the front optical member closer to the emission portion of the first reflective optical member.

In a specific aspect, the optical module further includes a frame member that positions the second reflective optical member, wherein the frame member includes a fifth positioning surface brought into contact with the second reflective optical member in a sixth direction perpendicular to the first imaginary plane and parallel to a normal line of a fourth imaginary plane on which the image light emitted from the emission portion of the second reflective optical member is incident, and a sixth positioning surface brought into contact with the second reflective optical member in a seventh direction perpendicular to the first direction and intersecting the sixth direction. In this case, in the sixth direction and the seventh direction in which influence on accuracy is relatively large because the optical module is an off-axis system, the second reflective optical member is positioned using the fifth positioning surface and the sixth positioning surface, which makes it possible to minimize deterioration in imaging accuracy caused by position shift of the second reflective optical member.

In a specific aspect, the fifth positioning surfaces include a pair of flat surfaces spaced apart in the first direction with the optical axis of the image light interposed therebetween. In this case, rotation of the front optical member about an axis perpendicular to the first direction and the sixth direction can be restricted by the fifth positioning surfaces.

In a specific aspect, the sixth positioning surface includes flat surfaces that are spaced apart in the first direction with the optical axis of the image light interposed therebetween and that extend substantially perpendicular to the first direction and the seventh direction, and a flat surface extending substantially in the first direction. In this case, rotation of the front optical member about an axis perpendicular to the first direction and the seventh direction and about an axis parallel to the first direction can be restricted by the sixth positioning surface.

In a specific aspect, the supporting member is coupled, via the rear optical member, to a frame member that positions the second reflective optical member.

A head-mounted display apparatus according to a specific aspect includes the optical module described above, and a control device configured to cause the display element to perform display operation.

A method for manufacturing an optical module according to a specific aspect is a method for manufacturing an optical module including an image element, a first reflective optical member configured to cause image light emitted from the image element to be incident on an incident portion, to be reflected by an inner reflection portion, and to be emitted from an emission portion, a second reflective optical member configured to reflect the image light from the first reflective optical member toward a pupil position, and a supporting member disposed between the first reflective optical member and the second reflective optical member and configured to position the first reflective optical member, wherein the first reflective optical member emits the image light from the emission portion in a direction intersecting an optical axis of the image light incident on the incident portion as seen from a first direction parallel to a normal line of a first imaginary plane including the optical axis of the image light incident on the incident portion and an optical axis of the image light emitted from the emission portion, the supporting member includes a first limiting portion and a second limiting portion facing the first reflective optical member in the first direction, the supporting member includes a first positioning surface brought into contact with the first reflective optical member in a second direction perpendicular to the first imaginary plane and parallel to a normal line of a second imaginary plane on which the image light emitted from the emission portion of the first reflective optical member is incident, and a second positioning portion brought into contact with the first reflective optical member in a third direction perpendicular to the first direction and intersecting the second direction, the method including, while positioning the first reflective optical member by fitting using the first limiting portion and the second limiting portion, positioning the first reflective optical member by biasing using the first positioning surface and the second positioning portion.

In the method for manufacturing the optical module described above, in the second direction and the third direction in which influence on accuracy is relatively large because the optical module is an off-axis system, the first reflective optical member is positioned by biasing using the first positioning surface and the second positioning portion, which makes it possible to minimize deterioration in imaging accuracy caused by position shift of the first reflection optical member.

What is claimed is:

1. An optical module comprising:
   an image element that emits an image light;
   a first reflection member that includes:
      an incident portion on which the image light is incident,
      an emission portion that emits the image light, and
      a reflection portion that reflects the image light from the incident portion toward the emission portion;
   a second reflection member that reflects the image light from the first reflection member toward a pupil position;
   a rear optical member disposed between the first reflection member and the second reflection member in the optical path of the image light;
   a front optical member disposed between the image element and the first reflection member in the optical path of the image light; and
   a supporting member that is disposed between the first reflection member and the second reflection member in an optical path of the image light, wherein the supporting member includes:
      a first limiting portion,
      a second limiting portion facing the first limiting portion in a first direction,
      a pair of first positioning portions contacts with the first reflection member in a second direction intersecting the first direction, and
      a second positioning portion contacts with the first reflection member in a third direction perpendicular to the first direction and intersecting the second direction,
   the supporting member supports the rear optical member on an opposite side, in the second direction, from the first reflection member,
   a distance between the first reflection member and the front optical member is shorter than a distance between the first reflection member and the rear optical member, and
   the first reflection member includes, on each of one side and the other side in the first direction,
      a third positioning surface brought into contact with the front optical member, and
      a fourth positioning surface that is brought into contact with the front optical member and that is different from the third positioning surface.

2. The optical module according to claim 1, wherein the pair of first positioning portions are spaced apart in the first direction have a band-shaped flat surface, respectively, the band-shaped flat surface extending in the first direction and the second direction.

3. The optical module according to claim 1, wherein the second positioning portions includes a band-shaped flat surface extending in the first direction.

4. The optical module according to claim 1, wherein the third positioning surface includes a band-shaped flat surface extending in the first direction.

5. The optical module according to claim 1, wherein the fourth positioning surface includes a flat surface.

6. The optical module according to claim 1, wherein the supporting member opens on an opposite side in the third direction from the second positioning portions.

7. The optical module according to claim 1, comprising:
   a frame member including
      a pair of fifth positioning surfaces brought into contact with the second reflection member and
      a sixth positioning surface that is brought into contact with the second reflection member in the second direction and that is different from the fifth positioning surfaces.

8. The optical module according to claim 7, wherein the pair of fifth positioning surfaces are spaced apart in the first direction.

9. The optical module according to claim 7, wherein the sixth positioning surface includes a flat surface extending in the first direction.

10. The optical module according to claim 7, wherein the rear optical member is brought into contact with the frame member.

11. A head-mounted display apparatus comprising:
    the optical module according to claim 1; and
    a control device configured to control display operation of the image element.

12. An optical module comprising:
    an image element that emits an image light;
    a first reflection member that includes:
       an incident portion on which the image light is incident,
       an emission portion that emits the image light, and
       a reflection portion that reflects the image light from the incident portion toward the emission portion;
    a second reflection member that reflects the image light from the first reflection member toward a pupil position;
    a supporting member that is disposed between the first reflection member and the second reflection member in an optical path of the image light, the supporting member including:
       a first limiting portion,
       a second limiting portion facing the first limiting portion in a first direction,
       a pair of first positioning portions contacts with the first reflection member in a second direction intersecting the first direction, and
       a second positioning portion contacts with the first reflection member in a third direction perpendicular to the first direction and intersecting the second direction; and
    a frame member including
       a pair of fifth positioning surfaces brought into contact with the second reflection member and a sixth positioning surface that is brought into contact with the second reflection member in the second direction and that is different from the fifth positioning surfaces.

13. The optical module according to claim 12, wherein the pair of fifth positioning surfaces are spaced apart in the first direction.

14. The optical module according to claim 12, wherein the sixth positioning surface includes a flat surface extending in the first direction.

15. The optical module according to claim 12, wherein the rear optical member is brought into contact with the frame member.

* * * * *